United States Patent [19]
Teel et al.

[11] Patent Number: 5,392,278
[45] Date of Patent: Feb. 21, 1995

[54] DISTRIBUTED MULTISITE SYSTEM ARCHITECTURE

[75] Inventors: James L. Teel, Goode; Philip C. Gulliford, Forest; Charles P. Brame, Forest; Wim A. Imron, Forest, all of Va.

[73] Assignee: Ericsson GE Mobile Communications Inc., Lynchburg, Va.

[21] Appl. No.: 658,844

[22] Filed: Feb. 22, 1991

Related U.S. Application Data

[63] Continuation-in-part of Ser. No. 573,977, Aug. 28, 1990, abandoned.

[51] Int. Cl.[6] .................. H04J 3/16; H04Q 11/08
[52] U.S. Cl. .................. 370/58.3; 370/85.7; 370/95.1
[58] Field of Search .......... 370/67, 85.1, 85.9, 370/85.7, 85.11, 94.1, 95.1, 95.3; 455/56.1, 33.1, 33.4; 379/58, 59, 63

[56] References Cited

U.S. PATENT DOCUMENTS

| | | | |
|---|---|---|---|
| 4,012,597 | 3/1977 | Lynk, Jr. et al. | 455/54.2 |
| 4,188,582 | 2/1980 | Cannalte et al. | 325/58 |
| 4,268,722 | 5/1981 | Little et al. | 179/2 EB |
| 4,451,827 | 5/1984 | Kahn et al. | 340/825.52 |
| 4,550,402 | 10/1985 | Gable et al. | 370/85 |
| 4,578,815 | 3/1986 | Persinotti | 455/15 |
| 4,590,467 | 5/1986 | Lare | 340/825.5 |
| 4,630,263 | 12/1986 | Townsend et al. | 370/85.8 |
| 4,654,879 | 3/1987 | Goldman et al. | 455/34.1 |
| 4,751,725 | 6/1988 | Bonta et al. | 455/34.1 |
| 4,792,948 | 12/1988 | Hangen et al. | 370/95 |
| 4,809,270 | 2/1989 | Baxter et al. | 370/85.7 |
| 4,835,731 | 5/1989 | Nazarenko et al. | 379/63 |
| 4,903,321 | 2/1990 | Hall et al. | 455/8 X |
| 4,905,302 | 2/1990 | Childress et al. | 455/32.1 X |
| 4,914,649 | 4/1990 | Schwendeman et al. | 370/95.1 |
| 4,926,495 | 5/1990 | Comroe et al. | 370/85.1 |
| 5,008,953 | 4/1991 | Dahlin et al. | 370/95.1 |
| 5,014,314 | 5/1991 | Mulford et al. | 455/56.1 |
| 5,127,101 | 6/1992 | Rose, Jr. | 455/51.1 |
| 5,175,866 | 12/1992 | Childress et al. | 455/8 |
| 5,200,954 | 4/1993 | Teel, Jr. et al. | 370/94.1 |
| 5,239,538 | 8/1993 | Teel, Jr. et al. | 370/58.3 |
| 5,253,253 | 10/1993 | Brame et al. | 370/85.11 |
| 5,276,442 | 1/1994 | Cree et al. | 340/825.52 |

FOREIGN PATENT DOCUMENTS 2075799A 11/1981 United Kingdom .
WO91/16797 10/1991 WIPO .

OTHER PUBLICATIONS

Motorola CENTRACOM Series II Control Center Systems, Field Maintenance Manual, Jun. 5, 1985.

*Primary Examiner*—Melvin Marcelo
*Attorney, Agent, or Firm*—Nixon & Vanderhye

[57] ABSTRACT

A multisite network switch for a series of RF digital trunked radio transceivers and dispatcher consoles. Each transceiver covers a certain site area. The switch establishes audio communications between different sites and various dispatcher consoles. The multisite switch has a distributed architecture in which each node of the switch is supported by a microprocessor controlled card. Each node interfaces with a site, dispatcher console, system manager or other system component.

11 Claims, 16 Drawing Sheets

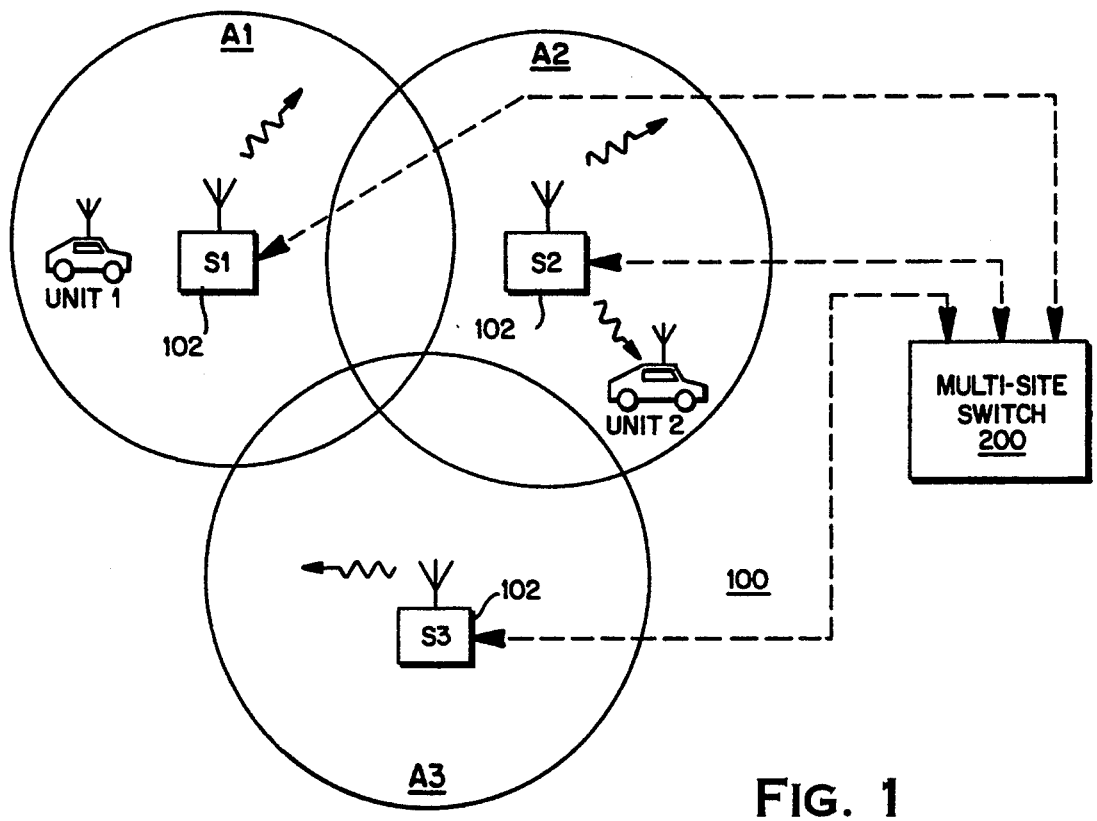
FIG. 1
FIG. 3
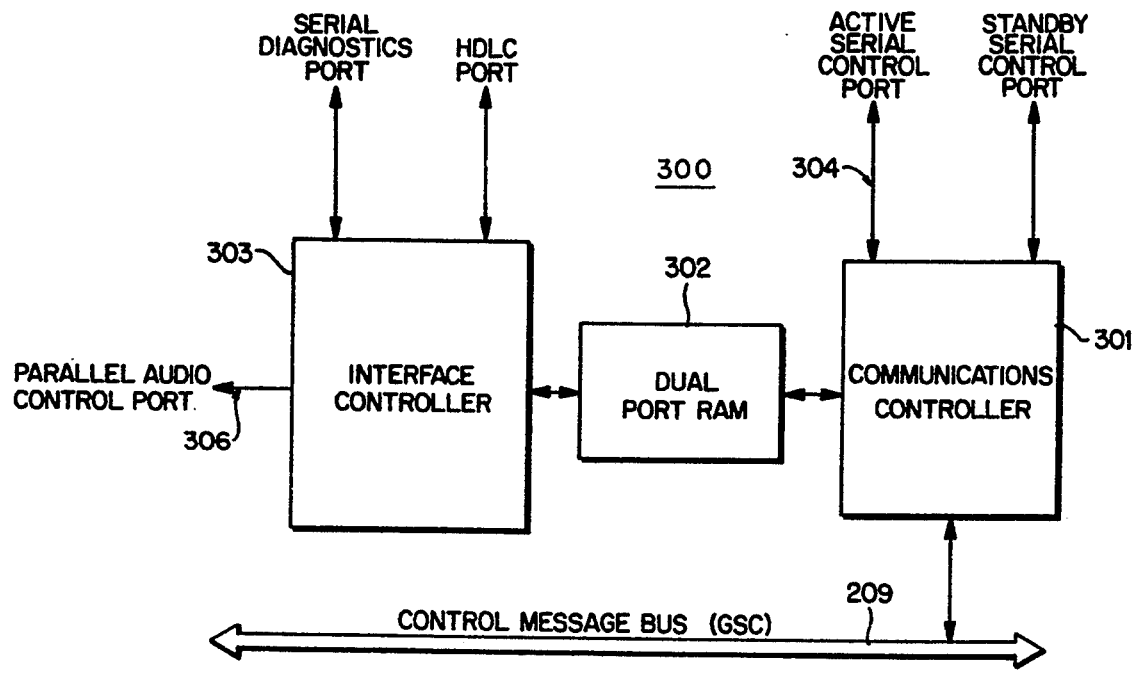

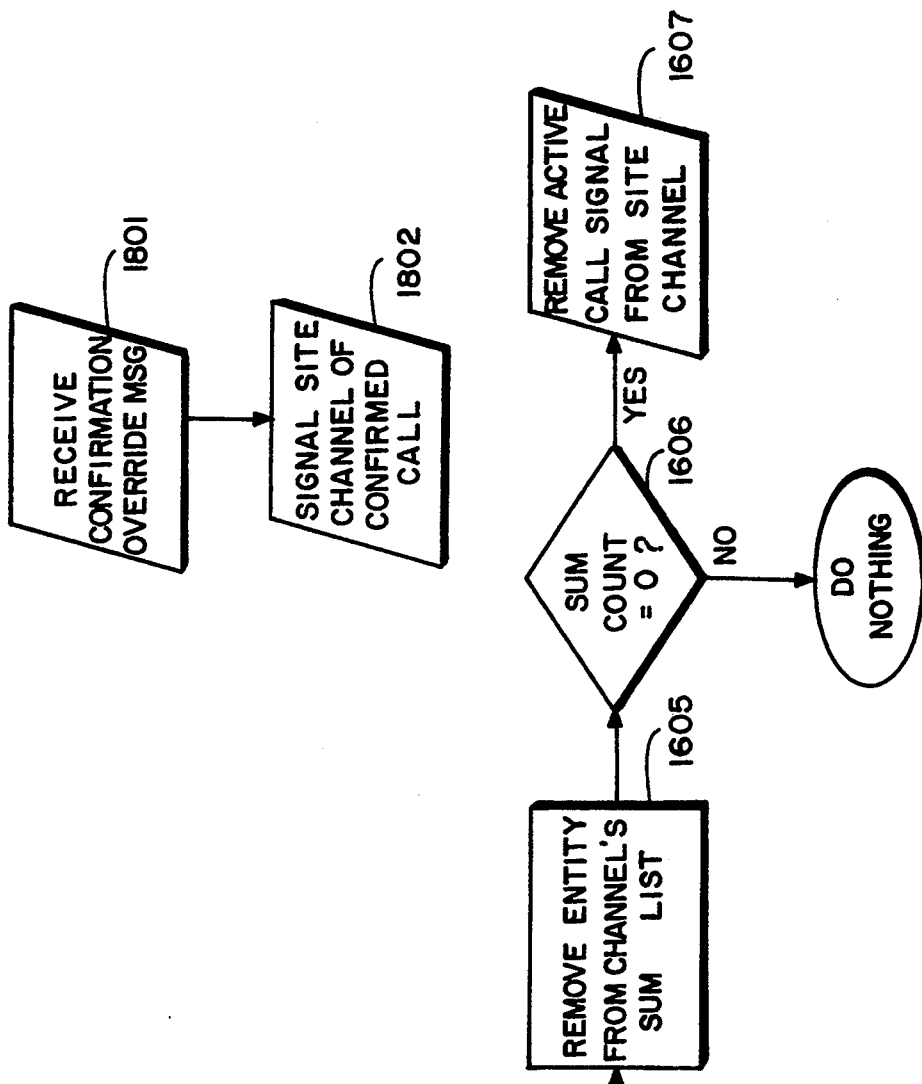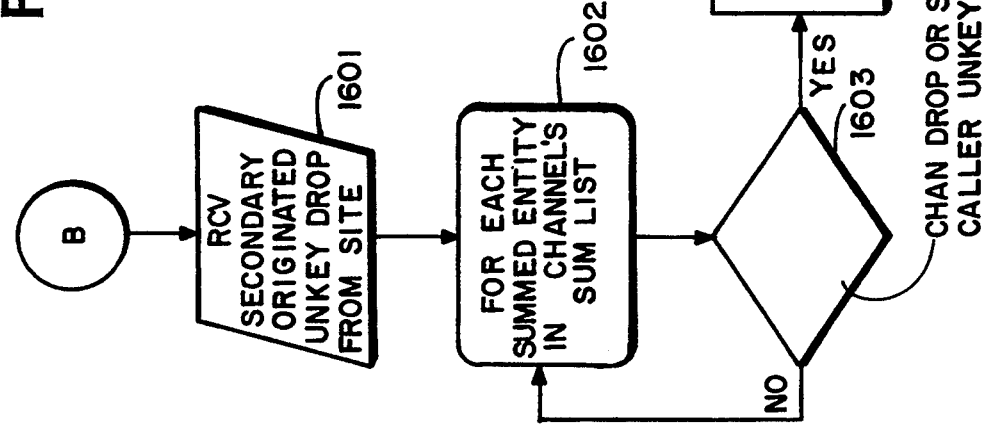

DISTRIBUTED MULTISITE SYSTEM ARCHITECTURE

RELATED APPLICATIONS

This application is a continuation-in-part of application Ser. No. 07/573,977, entitled "Distributed Multisite Coordination System" filed on Aug. 28, 1990, in the name of James L. Teel, Jr., now abandoned.

This application is related to the following copending commonly assigned U.S. patent applications.

Application Ser. No. 07/532,164, filed Jun. 5, 1990, entitled "Fail-Soft Architecture for Public Trunking System", now U.S. Pat. No. 5,175,866.

Application Ser. No. 07/658,843, filed Feb. 22, 1991, entitled "Dynamic Address Allocation Within RF Trunking Multisite Switch", now U.S. Pat. No. 5,276,442.

Application Ser. No. 07/658,640, filed Feb. 22, 1991, entitled Message "Bus Slot Update/Idle Control In RF Trunking Multisite Switch", now U.S. Pat. No. 5,253,253.

Application Ser. No. 07/658,798 filed Feb. 22, 1991, entitled "Controller Architecture" for RF Trunking Distributed Multisite Switch, now U.S. Pat. No. 5,239,538.

Application Ser. No. 07/658,637, filed Feb. 22, 1991, entitled "Protocol Between Console and RF Trunking Switch", now U.S. Pat. No. 5,200,954.

Application Ser. No. 07/658,636, filed Feb. 22, 1991, entitled "Audio Routing With A Trunked Radio Frequency Multisite Switch".

The disclosure of each of these related copending applications is incorporated by reference.

FIELD OF THE INVENTION

This invention relates to radio frequency (RF) signal transmission systems. In particular, the invention relates to a distributed network of trunked radio transmission systems in which command and audio signals from one system are switched through a distributed network to another transmission system.

BACKGROUND AND SUMMARY OF THE INVENTION

Multiple-site RF transmission systems broadcast signals from more than one base station. This allows radio communications to cover a larger area than is possible with a single base station.

The present invention relates to a network of several single site trunked radio systems. An example of a single site transceiver system is disclosed in commonly-assigned U.S. Pat. No. 4,905,302, entitled "Trunked Radio Repeater System" and U.S. Pat. No. 4,903,321 entitled "Radio Trunking Fault Detection System" which are incorporated by reference. Digital trunked radio transceivers capable of handling communications between numerous mobile units and dispatcher consoles in a single area are known.

It is generally impractical for a single VHF/UHF RF repeater transmitting site to effectively serve a large geographical area. The broadcast area of a single site is limited by several factors. The effective radiated power of the antenna is subject to legal and practical limits. In addition, natural and man-made topographical features, such as mountains and buildings, block signals from certain locations.

Multiple transmitting sites are necessary to provide RF communications to all locations within a given locality. Multiple transmitters may be needed to cover a rural community covering many square miles or a city having many buildings. FIG. 1 is a schematic diagram of a simplified multiple-site system having three radio repeater (transmitting) central sites S1, S2, and S3 providing communications to geographic areas A1, A2, and A3, respectively. Mobile or portable transceivers within area A1 receive signals transmitted by site S1, transceivers within area A2 receive signals transmitted by site S2, and transceivers within area A3 receive signals transmitted by site S3. Each site has a site controller that acts as a central point for communications in the site. To enable communications from one area to another, a switch networks the radio systems together to establish audio slots connecting one site controller to another. Thus, a caller in one area can communicate with someone in another area.

One known method to link several individual trunked systems is simulcasting. Simulcast systems broadcast the same signal at the same time from several base stations. A receiver in area A2 can listen to a signal that originated in area A1 because all of the site transceivers, including at S2, broadcast the same signal. There are difficulties when signals are broadcast simultaneously from several overlapping transceivers. In the areas where the signals overlap, signals from different transmitters interfere to create null regions and signals combine to generate undesirable audible signals which are received by the callee. Despite these problems, successful simulcast systems are operational and have overcome the problems inherent with simultaneous signal transmission. However, the present invention does not employ simulcast.

The present invention is directed to a multisite RF trunked repeater system. As with simulcast, mulitsite allows a caller in one area (e.g. A1) to communicate with a callee in another area (e.g. A2). Unlike simulcast, multicast does not broadcast signals simultaneously from several transmitters on a single channel into all areas. Multicast broadcasts signals only into those areas where the intended callee(s) is located. Moreover, in a multicast network, each site assigns a specific channel to a call independently of the channel assignments made by other sites. Thus, a single call may be broadcast from several site transmitters each operating on a different frequency.

In multisite, the site controller (S1) receives a call from a mobile radio in A1 requesting a channel to communicate with a specific callee. A caller requests a channel simply by pressing the push-to-talk (PTT) button on his microphone. This informs the site controller that a channel is requested. The PTT signal is transmitted to the unit on a control channel that is continuously monitored by the site controller. The site controller assigns a channel to the call and instructs the caller's radio unit to switch from the control channel to the channel assigned to the call. This assigned channel is applicable only within the area covered by the site.

In addition, the site controller sends the channel assignment to the multisite network switch. The switch assigns an internal audio slot to the call. The switch also sends a channel request to all other site controllers or to only those site controllers having a designated callee within their area. Upon receiving a channel request, these secondary site controllers assign a channel to the call. Again, each secondary channel is operative only in the area covered by the secondary site controller. The secondary site controller(s) also sends the channel assignment back up to the multisite switch. The caller can then communicate with a unit or group in an other area via the multisite switch. The call is initially transmitted to the primary site controller, routed through the assigned audio slot in the switch and retransmitted by the secondary sites on various assigned channels in those other areas.

When the caller ends the call, the primary site controller deactivates the assigned channel for that site and notifies the network switch that the call is terminated. There may be a brief "hang time" after the end of the call during which the channel remains assigned. During this hang time, the call can be rekeyed without going through the channel assignment procedure.

When the call is dropped, the network switch sends an end of call command to the secondary site controllers. A call is terminated in a similar format and operation as the slot assignment. Instead of establishing an audio route between sites and through the switch, the end of call command causes the assigned channels to be released.

In addition to providing communications between mobile radio units in different areas, the multisite network switch provides communications between dispatchers and mobile radio units. The dispatcher consoles are connected to the network switch in the same manner as are the site controllers. A dispatcher console can issue a channel call request through the network switch to a site controller in another area to call a mobile unit or to another dispatcher console to call a dispatcher in another area.

In addition to all of the features that the mobile units have, each dispatcher console has the ability to participate in any call in its area or to its assigned groups. Thus, when a call comes through the network switch from another area to a mobile radio, the network switch informs the dispatcher console of the call in addition to notifying the site controller. The dispatcher can listen in or participate in the call to the mobile radio.

The network switch is also capable of handling calls to groups of mobile units and/or dispatcher consoles. The wide area switch manages group calls and monitors the network to ensure that the site controllers for all of the callees in the group assign a channel to the group call. If a channel is not assigned, the wide area switch advises the caller that the wide area call cannot be formed as requested. The caller then has the option of re-keying the call so as to reach those areas having assigned channels.

The multisite switch maintains site and track masks in its databases to identify and locate each unit and group in the entire radio system covered by the multisite switch. A site mask is maintained for each radio unit in the system and each group of units. A track mask is also maintained for each user and group in the system. The site masks are static and are stored in a system manager for the system. The site mask must be uploaded from the system manager to appropriate nodes in the switch when a call is initially placed. The track mask is dynamic and is continuously updated by log-ins and call activity from the units in the various sites.

In the preferred embodiment, each mask is a 16-bit field. Each bit corresponds to a particular site. A one (1) bit signifies that this site should be involved in calls to the group or individual associated with the mask. A group can have multiple bits set in its site and track masks because there may be group members spread over several sites. An individual may have multiple bits set in his site mask but only one bit set in his track mask. An individual can be in only one site at a time. Accordingly, the track mask should only have one bit set at a time. By use of these masks, the multisite switch can determine which sites should participate in a call and which sites have certain units and group members. Using this information, the switch can route audio to the appropriate sites.

There are many advantages that multisite has over simulcast. Multisite avoids the difficulties associated with transmitting simultaneously several RF signals on the same channel. The complicated RF electronics and timing circuitry needed to overcome the problems that arise from overlapping signals that are required for simulcast are not needed in a multisite system. Multisite avoids the problems of overlapping signals by having each area assign a different channel for any one call. Moreover, there is no need for simultaneous calls in multisite as there is in simulcast. Furthermore, multisite signals need be broadcast only in those areas having a party participating in the call. Whereas, simulcast broadcasts calls over all areas regardless of whether there is anyone listing to the call in every area.

The present invention relates to a multisite switch having a distributed architecture. The logical functions of the switch are shared by various microprocessor operated nodes distributed throughout the switch. The nodes share the computational workload of the switch. Each node is connected to a site controller, dispatcher console, the system manager or other component of the overall radio system. The nodes coupled to site controllers are referred to as Master II Interface Modules (MIMs) and the nodes coupled to dispatcher consoles are referred to as Console Interface Modules (CIMs).

Each node of a multisite network switch is supported by a switch controller card operated by microprocessors. All of the cards have substantially the same hardware and are interchangeable. The MIM and CIM cards have identical hardware. There is one card for each site controller and each dispatcher console coupled to the switch. Each card acts as a gateway into the network for its site controller or dispatcher console.

The multisite switch does not completely fail if one card breaks down. Wide area communications, i.e. calls between site areas, continue despite the failure of a node. If a card fails, then the gateway to the network is closed only for its site controller or dispatcher console. Failure of a node prevents wide area communications only with respect to the site or console connected to the failed node. Mobile units in the area serviced by the failed card will not be able to call a unit in another area or receive calls from another area.

Local communications within an area are not disabled by the failure in the multisite switch. A site controller is not disabled by a failure of its associated node in the multisite switch. In particular, the failure of a MIM does not disable the site controller to which the MIM is connected. The site controller continues to operate and local communications within the area are unaffected by a failure in the multisite switch.

The ability to continue wide area calls after a node in the switch has failed provides several advantages to a distributed architecture switch over a central architecture switch. In a central architecture, a central processing unit (CPU) governs the operation of the switch. If this CPU fails, then the entire switch fails. Wide area communications are completely shut down by the failure of a multisite switch having a central architecture. As already stated, wide area communications are not completely shut down by a failure in a switch having a distributed architecture.

Distributed network multisite systems have a much faster data transfer rate than comparable central architecture multisite systems. Central computers process information serially. All communications passing through the switch must be serially processed by the central computer. The central computer slows communications because of its serial operation. Distributed network systems achieve parallel processing by sharing the computational task between several processors. Distributed networks are generally significantly faster than central computers.

Distributed network multisite systems are generally less expensive than multisite systems having a central computer. The hardware needed for a distributed network is a series of microprocessor controlled cards that handle communications between the multisite switch and the site central controllers, dispatcher consoles and various other users of the network. The cost of a series of cards is typically much less than that of a central computer. Moreover, a distributed network switch can be expanded simply by adding cards. To expand the capacity of a central computer requires purchasing a larger central computer.

BRIEF DESCRIPTION OF THE DRAWINGS

FIG. 1 is an illustration of three site radio system networked together by a multisite switch;

FIG. 3 is a block diagram of the switch controller card;

FIG. 17 is flow chart showing a secondary site releasing a channel;

FIG. 18 is a flow chart showing a confirmed call override by a primary site.

DETAILED DESCRIPTION OF THE DRAWINGS

An exemplary trunked radio repeater system in accordance with the invention is generally depicted in FIG. 1. Individual remote units communicate with each other through shared radio repeaters that are part of the trunked repeater system 100. The system is composed of several sites 102. Each site includes a site transceiver that broadcasts signals over a certain area and a site controller. For example, site S1 broadcasts over area A1. The remote units can communicate with units within their own area or with units in other areas. The remote units also communicate with the dispatcher console for each site.

Each site is controlled by a site controller. The site controller controls much of the data and audio traffic in its area. The site controller is described in more detail in the application and patents previously mentioned. For purposes here, the site controller communicates with the multisite switch 200. The multisite switch handles communications between sites.

Figure 2:
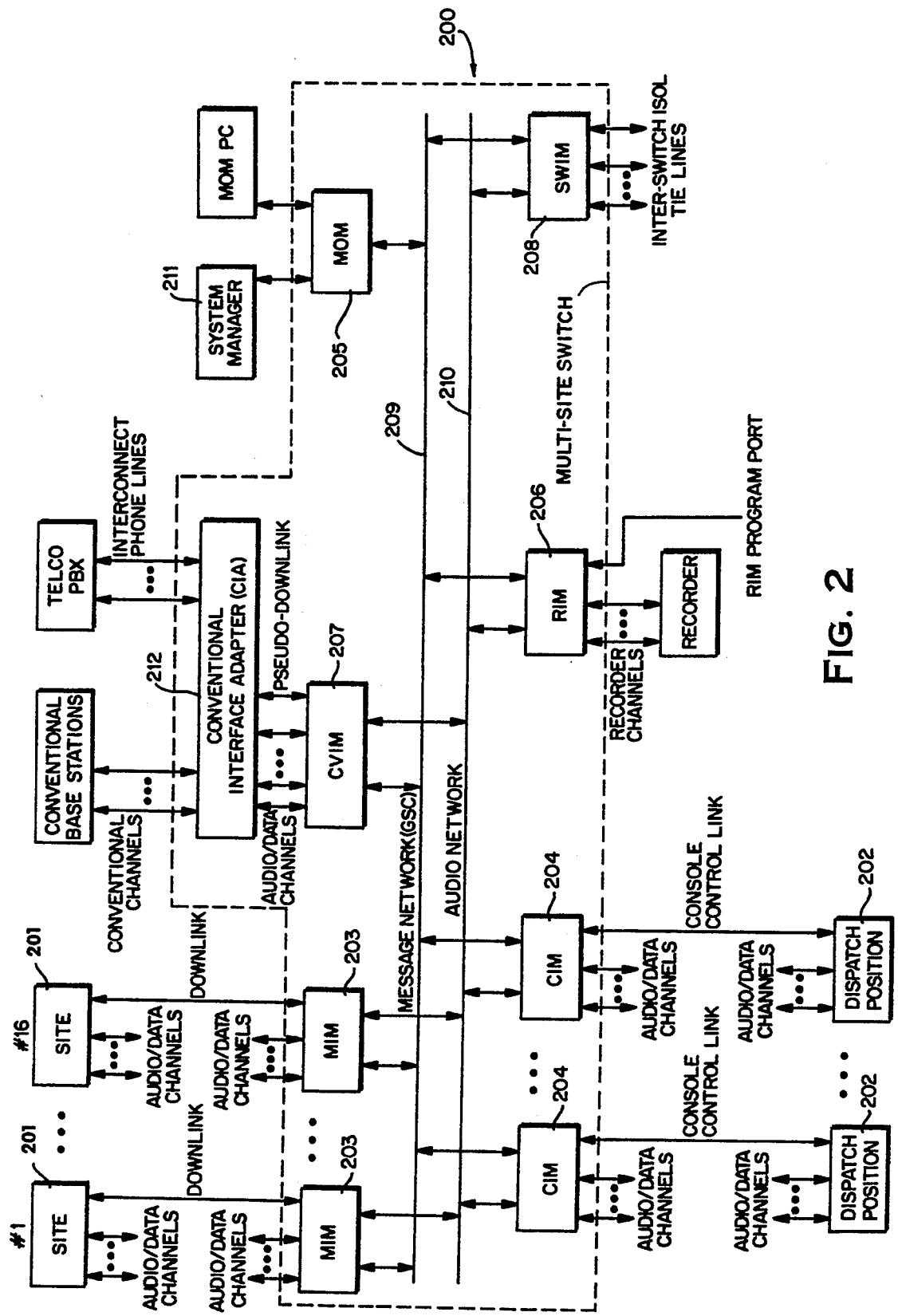
FIG. 2 is a schematic of the architecture for a distributed network multisite.

Communications between sites are conducted through the multisite switch 200 shown in FIG. 2. The multisite switch communicates with each of the site controllers 201 in every site and the dispatcher consoles 202. There are both data and audio communication lines between the multisite switch and each site controller and dispatcher console.

The primary responsibility of the multisite switch is to establish and remove audio connections among the audio channels connected to it. The multisite switch comprises a local area network of nodes. As shown in FIG. 2, the nodes are labelled corresponding to whether they interface with a site controller, dispatcher console or other system component. For example, MIMs 203 are nodes in the switch that interface with site controllers and CIMs 204 are nodes that interface with dispatcher consoles. There are other nodes such as a Monitor Module (MOM) 205, a Recorder Interface Module (RIM) 206, Conventional Interface Module (CVIM) 207 and Switch Interconnect Module (SWIM) 208.

The MOM 205 is the interface for the system manager and the MOM PC (personal computer). The system manager updates the databases in all of the nodes. The MOM maintains certain centralized databases including databases for smart calls and confirmed calls. Smart calls relate to the operation of the dispatcher console. A call is "smart" if the call has been selected, i.e., being listened to by the dispatcher via a select speaker in the console. If the call is not selected by at least one console, then a flashing indicator light appears on certain consoles. Thus, several dispatchers can readily see which calls are not being monitored by at least one dispatcher.

A confirmed call is one for which the audio channel and slot assignments must be confirmed before the caller begins talking. The system manager sets which calls are to be confirmed and provides this information to the site controllers. The channel assignment for the originating call from the primary site controller instructs the multisite switch that the call is to be confirmed. The MOM receives a message that a confirmed call is requested and then tells the primary MIM which secondary MIMs must confirm the call by sending a site mask to the primary MIM. The site mask identifies each secondary MIM to participate in the confirmed call.

The RIM 206 interfaces recorders to the switch. Recorders are assigned to record calls for various groups or units. The CVIM 207 functions much the same as a MIM but is indirectly coupled to telephone lines and standard base stations whereas the MIMs are coupled to site controllers for digital trunked radio systems. The conventional interface adapter (CIA) 212 is merely an interface between the CVIM and the telephone lines and base stations. Similarly, the SWIM interfaces the switch with telephone lines.

Each node in the multisite switch is supported by a microprocessor controlled communications card. All of the cards for the MIMs, CIMs, CVIM, MOM, RIM and SWIM have the same hardware and are interchangeable. The cards are said to have different personalities to indicate that they are assigned to, for example, a site controller or a dispatcher console (dispatch position). Each card can be easily configured to be a MIM, CIM, etc., by setting a few switches on the card. Thus, the cards are truly interchangeable.

The nodes of the switch are each connected to a digital message bus 209 and a digital audio bus 210. The message bus 209 is shown in FIG. 2 as a message network using an Intel 80C152 Global Serial Channel (GSC) microprocessor. The message network is a high speed data bus that resides in the GSC microprocessor.

The audio bus 210, in the present embodiment, comprises 32 time division multiplexed buses. Each bus contains 32 slots that each carry a single audio channel. A maximum of 1024 audio slots may be routed through the switch (32 buses×32 slots). The audio slots are assigned by the MOM to specific nodes, e.g., MIMs and CIMs, when the switch is enabled.

As part of the switch start up procedure, the nodes connect their assigned bus/slots to the node's external channel inputs. For example, a MIM will couple each channel from the site controller to a separate audio bus/slot. Once the bus/slot is linked to the channel, the bus/slot receives the output from the channel through the host node. Of course, the channel has no intelligible signal until it is assigned to a call by the site controller. Although a bus/slot is linked to a site channel for purposes of transmission, no other node is listening to that bus/slot until the host node sends a slot assignment message throughout the switch notifying the other nodes that a call has been assigned to that bus/slot.

FIG. 3 shows a block diagram of one of the cards 300. This diagram is applicable to all of the nodes of the switch except for the conventional interface adapter (CIA). Thus, the hardware for the MIM, CVIM, MOM, SMIM, RIM and CIM is a switch controller card. Each card includes a communications controller 301, a dual port random-access-memory (RAM) chip (302) and an interface processor 303.

The communications controller 301 is a message router. It routes messages between the control message bus 209, the serial port leading outside of the switch 304, the message bus and the interface processor 303 through the dual port RAM 302. In the present embodiment, the communications controller is an Intel 80C152 microprocessor. The communications controller is coupled to the message bus 209. This controller places messages onto the bus and receives messages from the message bus. Messages received from the site controller over the serial port are translated into a format usable by the multisite switch. The communications controller also translates switch messages into a format that the site controller understands.

The interface processor 303 performs substantially all of the logical functions for the card. In effect, the interface processor is the intelligence for the card. The interface processor, in this embodiment, is an Intel 80C186 microprocessor. The interface processor acts as a switch for the audio network and assigns slots to active audio channels through the parallel audio control port 306.

Each call through the switch is patched to a slot on the audio bus. When the call is terminated, the call is terminated and the slot is made available for assignment to another call. The interface processor for each MIM assigns slots, connects audio slots to the site controller or dispatcher console to establish a communications link, and terminates calls. Since all MIMs and CIMs perform these functions, they must continually inform each other and the other nodes of their slot assignments. Accordingly, the MIMs and CIMs send messages regarding slot assignments, slot updates and slot idles over the message network 209 to other nodes.

The communications controller 301 for each node initially processes all of the messages on the message network. Slot assignments are forwarded to the interface processor through the dual port RAM. Redundant slot update/slot idle messages are not forwarded to the interface processor by its communications controller. Messages regarding slot updates or idle slot control are processed by the communications controller by referring to a bit map located in the RAM storage 302. Update messages are sent periodically by a primary MIM to confirm to the other nodes the active status of a slot. When a primary MIM terminates a call it sends a slot idle message to the other nodes. The primary MIM also periodically sends update idle messages until the slot is reassigned to another call.

The slot bit map in the dual-port-RAM 302 identifies the status of each audio slot on all 32 buses. The bit map is updated by slot assignment messages, slot idle messages and slot updates that are sent on the message bus. Slot assignment messages inform all nodes of the bus and slot number hosting the call. A more complete disclosure of the slot bit map and slot status messages is contained in Application Ser. No. 07/658,640 entitled Message "Bus Slot Update/Idle Control In RF Trunking Multisite Switch" identified above.

The MIM is coupled to the site controller through a standard serial land line (e.g. a telephone line). The MIM receives digital command signals from the site controller through a down link line such as is described in commonly assigned U.S. Pat. No. 4,835,731, entitled "Processor-To-Processor Communications Protocol For A Public Service Trunking System" and is incorporated by reference.

Each MIM maintains databases that identify the units within its site and the groups that correspond to active calls. These databases are set up by the system manager 211 and sent to all of the switch nodes. The unit database identifies each unit in the wide area system. For each MIM, some of the units will be in its assigned site area and others will be outside of its area. The MIM keeps track of which units are in its area.

TABLE A shows the format of each unit database entry. Each entry is three bytes long in the present embodiment.

TABLE A

UNIT DATABASE

Wide Area/Track/Force/"on this site" Bits
Current Group

The wide area bit is set to designate that the unit is to participate in multisite and be capable of communicating from one site to another via the multisite switch. The track bit designates whether the unit is to be tracked by the multisite switch as the unit moves from one site to another. Tracking is discussed in greater detail with respect to the login procedure. When the force bit is set for a unit on a particular site, then that site's MIM will assign a channel to broadcast from this unit. If the force bit is not set, then a channel will be assigned to a call from the unit only if there is a callee in the MIM's area. Accordingly, if a receiving MIM sees that there are no callees in its area, then the MIM will not request a channel for the call. The "on this site" bits indicate whether the unit is in the area covered by the site. Finally, the current group bits identify the group currently selected by the unit.

Each unit may be capable of participating in several different groups and the unit operator selects the desired group at any particular time. Whenever a call comes in for the selected group, then the unit will receive the call.

The MIMs also maintain a database of the groups. A group is a collection of units that communicate together on a single call. For example, there may be a group for the fire department that allows all of the fire trucks to listen to the central dispatcher or the fire chief. The dispatcher dials this group into his console to broadcast messages to all fire trucks. Similarly, groups can be established of rescue stations, police units assigned to a particular precinct, and many other combinations of users of the public service radio system.

The format for each group on the MIM database is shown in TABLE B.

TABLE B

GROUP DATABASE

Wide Area/Track/Force

There is one byte allocated for each group entry in the database. The wide area bit designates whether the group is to participate in multisite. Groups that are physically confined to one site need not be able to participate in multisite and, thus, the wide area bit will not be set for those groups. The track bit designates whether members of the group being called are to be tracked from one site area to another. The force bit determines whether calls for this group are to be broadcast to a specific area regardless of where the units are. If the force bit is not set, then a channel will be assigned for group calls only in those areas having at least one active group member.

The MIMs also maintain a group count database. The group count database indicates the number of group members in the MIM's site area. The system manager sets up a group count database for each node. Each MIM records the number of group members in its area for each group. Group members are counted when they enter or leave the area and when they select a group.

As discussed below, when a unit enters a new area, a login message is sent from its new site controller to the corresponding MIM identifying the unit and its current group. The MIM receiving the login signal through its serial port, i.e. from the site controller, increments the count for the unit's group. Similarly, when a unit leaves an area, the corresponding MIM logs the unit out of its group count database by decrementing the count of the unit's current group. In addition, when a unit changes groups, it sends a group login message that causes the MIM for its area to increment the count for the newly selected group and decrement the count of the old group.

The unit databases are continually updated by each MIM. The databases are also updated from time to time by the system manager operator. The unit databases on each MIM contain the same information with the exception of the "on this site" bits. These bits are set only if the corresponding unit is in the area serviced by the MIM and are, thus, unique to each MIM. With the exception of the "on this site" bits, the unit databases are set by the system manager.

The "on this site" bits in the unit are set and reset during the login procedure followed by each radio unit as it moves from one site area to another. Each site broadcasts a control channel throughout the area covered by the site. Every radio unit in the area is locked onto this control channel. When a unit leaves an area and loses reception of the control channel, the radio scans for another control channel. The scanner will lock onto the control channel being broadcast in the area that the unit has moved into. When the unit locks onto this other control channel, the unit transmits a login signal to the site controller which in turn sends the login signal to its MIM. The login identifies the unit and its current group. The MIM receives the login signal and then switches the "on this site" bits for the database entries for that unit. In addition, the MIM places a signal on the message bus identifying the unit that logged into that site. All of the other MIMs monitor the message bus and check whether the message identifies a unit previously in their areas. The one MIM that had the unit, reads the login unit from the message bus and logs the unit out by resetting the "on this site" bits for its unit entry in the unit database.

There are several commands used by the multisite switch for activating a call from a remote radio unit and from a dispatcher console, for confirming receipt of the call request, and for terminating the call. Message diagrams, flow charts and state diagrams for these commands are presented in FIGS. 4 to 21.

The MIM communicates with the site controllers using the message format and protocol of the site controller. Descriptions of the commands employed by the site controller are contained in the commonly assigned patents and co-pending applications referred to elsewhere in this specification. In particular, U.S. Pat. No. 4,835,731, previously cited, sets forth many commands for a public service trunking system.

Figure 4:
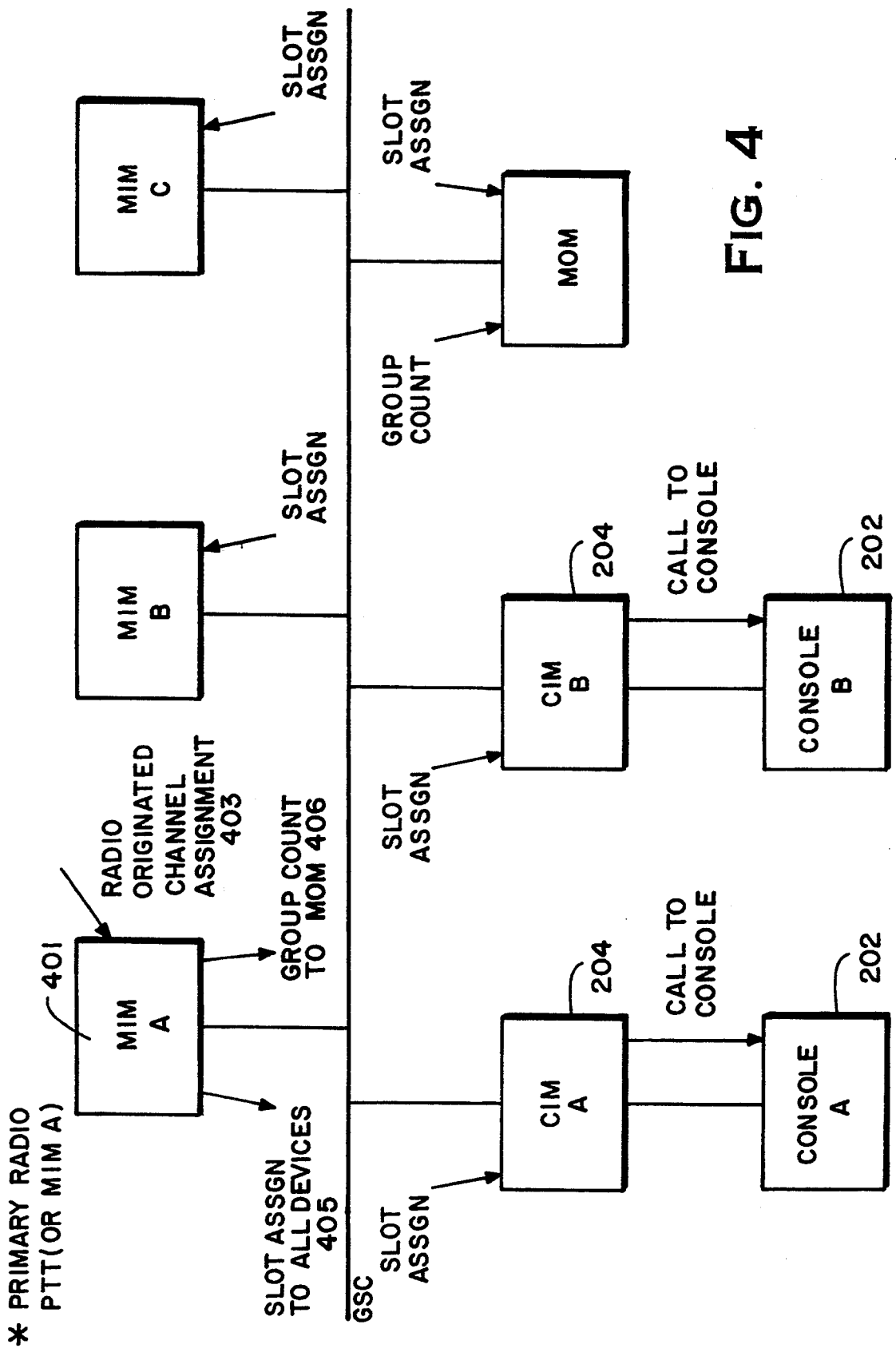
FIG. 4 is a message flow diagram for a primary radio push-to-talk (PTT) signal.

As shown in FIG. 4, a MIM 401 receives a radio originated channel assignment 403 from its corresponding site controller. This signal indicates that a remote unit in the area assigned to the MIM wants to call another unit or a group and its site controller has already assigned a channel to the call for its area. All channel assignments are sent to the multisite switch. The MIM assigned to the caller is the primary MIM and all MIMs assigned to callees are secondary MIMs. This channel assignment is received by the communications controller 301 in the MIM as are all communications from outside of the multisite switch.

The MIM responds to the radio originated channel assignment by sending two messages on the message bus for the multisite switch. A slot assignment message 405 is sent to all switch components identifying the slot on the audio bus that is assigned to the call. A group count message 406 is sent to the MOM only if the count transitions from 0 to 1.

Upon receipt of the slot assignment message, each CIM 204 looks through its database to determine if the callee is programmed at the console. If the callee is programmed, the CIM informs its corresponding dispatcher console of the call and connects the audio slot for the call to the dispatcher console 202. Thus, the dispatcher console can monitor all calls that involve groups or units that have been programmed by the dispatcher.

Figure 5:
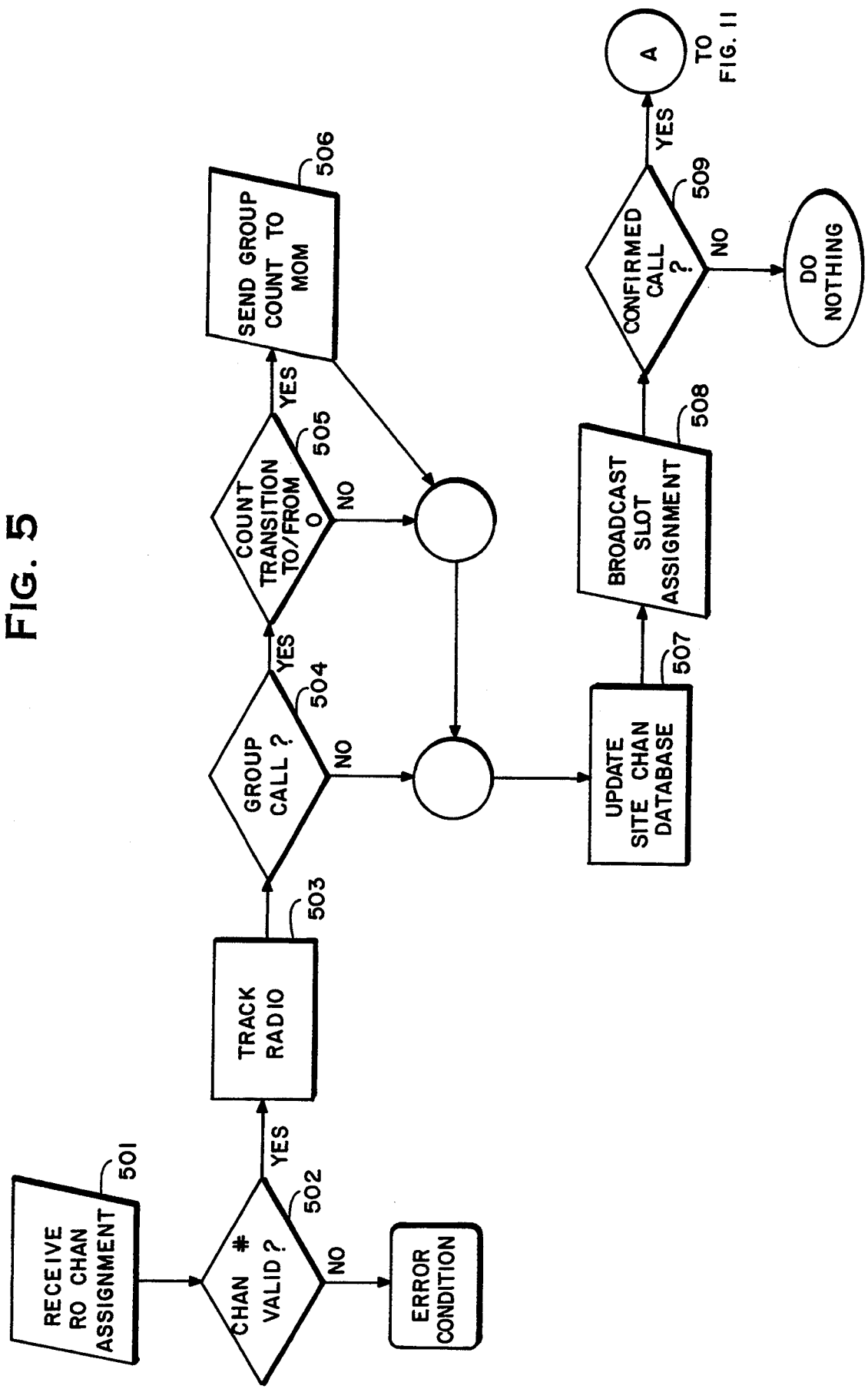
FIG. 5 is a flow chart for a primary radio PTT from a primary site.

As shown in the flow chart of FIG. 5, upon receipt of a radio originated call from the site controller, step #501, the primary MIM confirms that the channel number is valid in step #502. An error condition is signaled if the number is not valid. If the number is valid, then in step #503 the MIM tracks the unit making the call by setting the "on this site" bit for the unit in its unit database. In step #504 the MIM checks whether a group call is being made. If the call is to a group, then the count for that group is indexed to update the group count in step #505. If the count transitions to or from zero, then the group count is sent to the MOM in step #506. The MOM maintains a group count database that indicates which nodes (MIMs and CIMs) correspond to active group members. After handling the group count, the site channel database is updated to reflect the new channel assignment in step #507. The MIM keeps track of all slot assignments made by the MIM.

The MIM translates the channel assignment as sent by the site controller into a slot assignment for use within the multisite switch. In step #508, the slot assignment is broadcast to all other switch components. The primary MIM logs the channel as active so that it will be serviced by the MIM's background updating task. The principal updating task is to send slot update messages to the other nodes. If the call is a confirmed call, then the primary MIM proceeds from step #509, to the steps discussed below with respect to FIG. 11.

Figure 6:
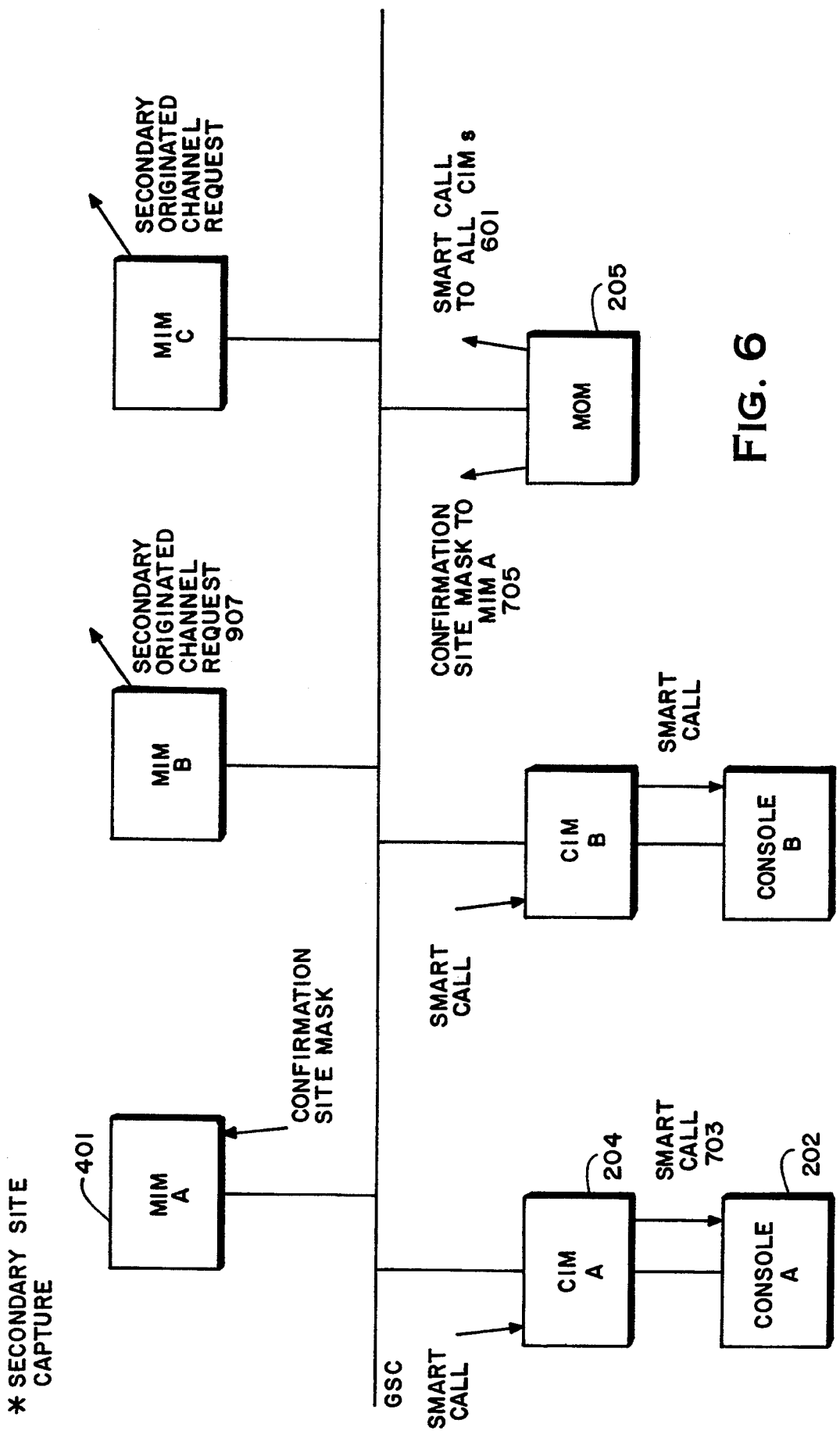
FIG. 6 is a flow diagram for messages issued by the MOM in response to a primary radio PTT.
Figure 7A:
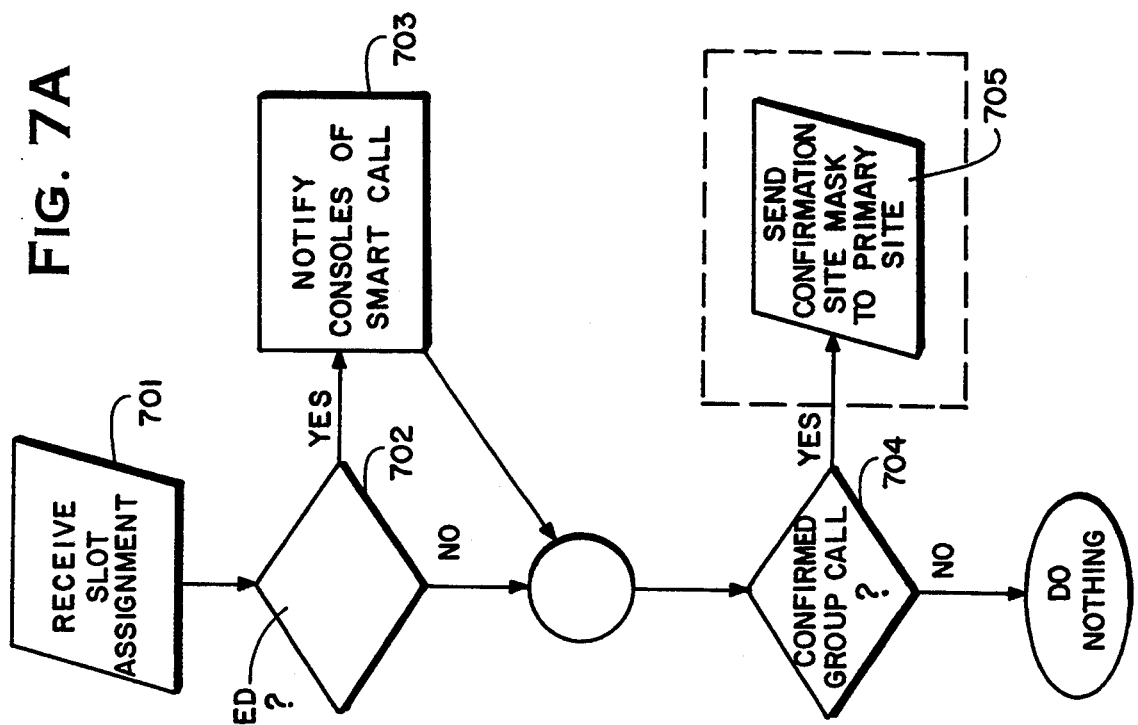
FIG. 7 is a flow chart for the MOM when receiving a primary radio PTT.
Figure 7:
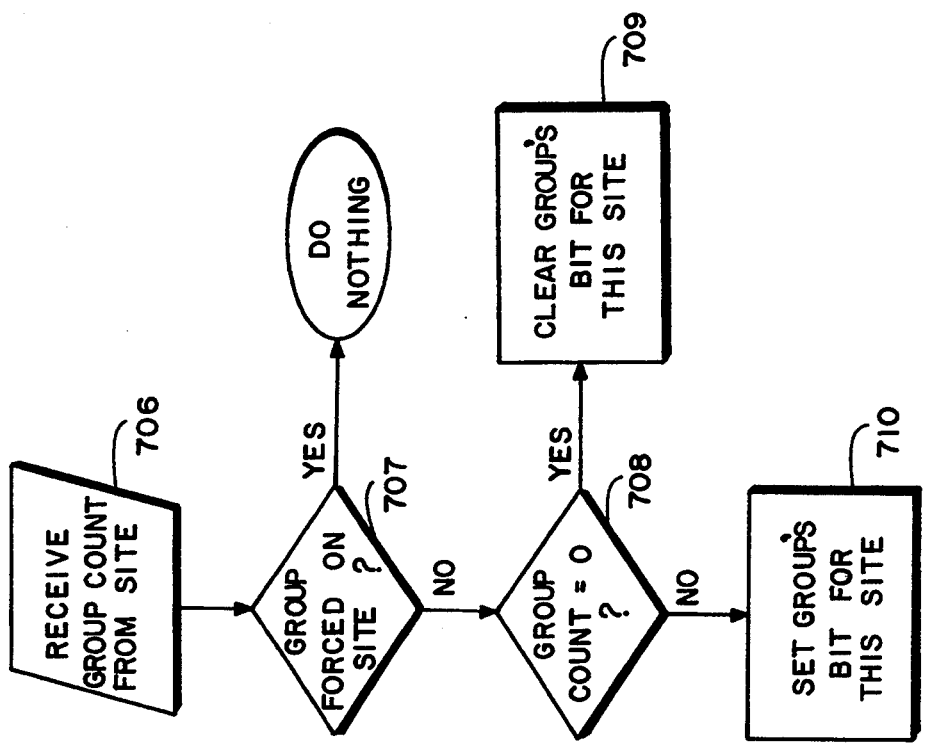

As shown in FIGS. 6 and 7, the MOM 205 sets up group calls and informs CIMs of smart calls. The MOM tracks which calls have been "selected" by a dispatcher console, and, thus, are being broadcast over the console's select speaker. In step #701, the MOM receives each slot assignment. If a call is "selected," then the MOM notifies the CIMs that it is a smart call (601) in steps #702 and #703. In step #704, the MOM checks whether the call is a group confirmed call. If it is, then the MOM sends a confirmation site mask to the primary MIM in step #705. The confirmation site mask identifies each node that is to participate in the call and enables the primary MIM to track receipt of all the confirmation messages from the secondary MIMs.

Upon receipt of a group count 407 from a MIM, step #706, the MOM first checks whether the group is forced on the MIM in step #707. If the group is forced, then each MIM will automatically request a channel for the group call and the MOM does not need to do anything. If the group is not forced, then in step #708 the MOM checks if the group count is zero and, if so, clears the group bit for that site in step #709. If the count is zero, then there are no units from the group in the area corresponding to the MIM and the MOM clears the group's bit for that MIM in the confirmation site mask stored in the MOM. If the group count is not equal to zero, then the group bit is set for that MIM in step #710. The MOM maintains this group count database for use with confirmed calls.

Figure 8:
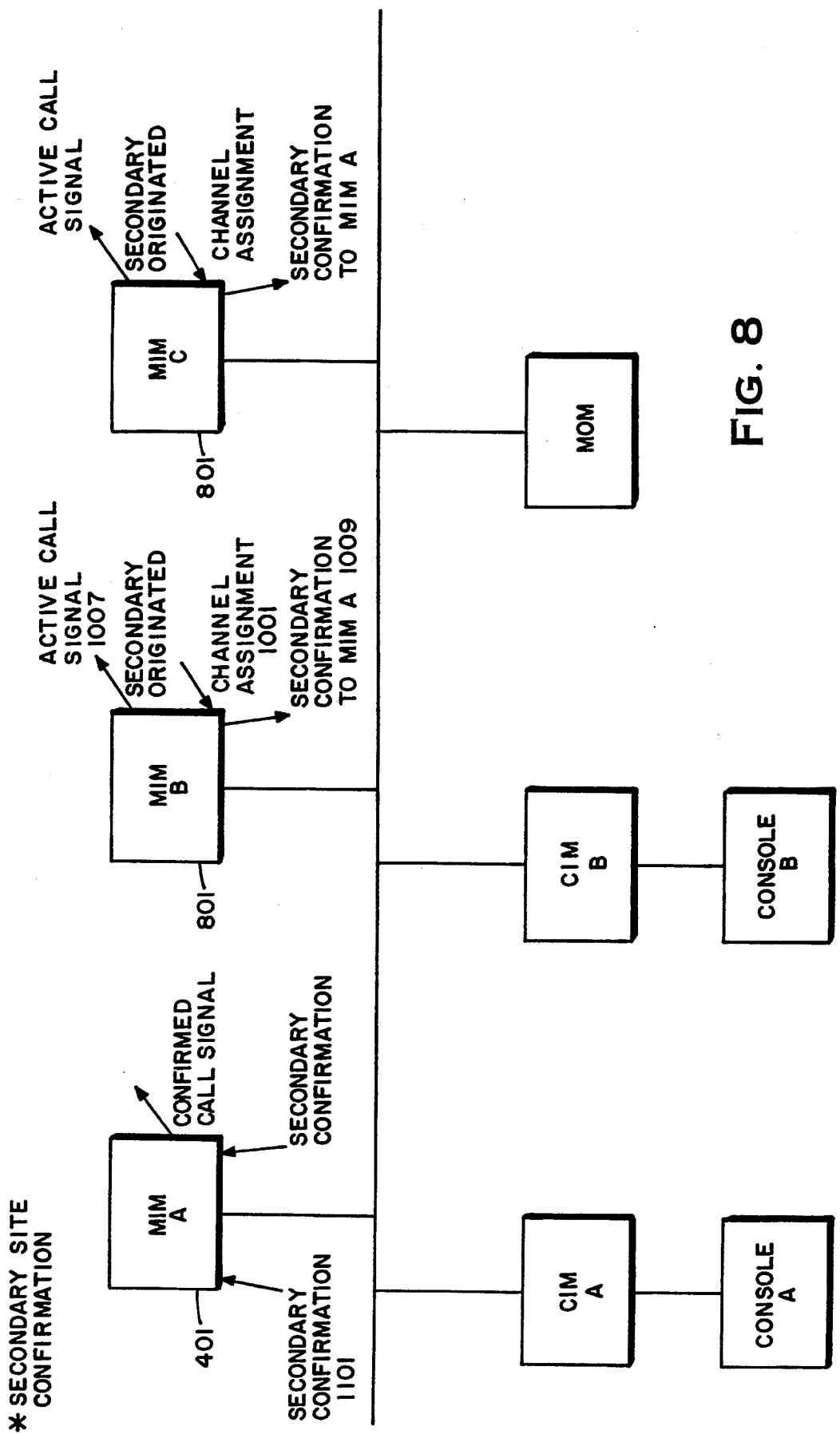
FIG. 8 is a message flow diagram showing a secondary site capturing a channel request from a primary site.
Figure 9:
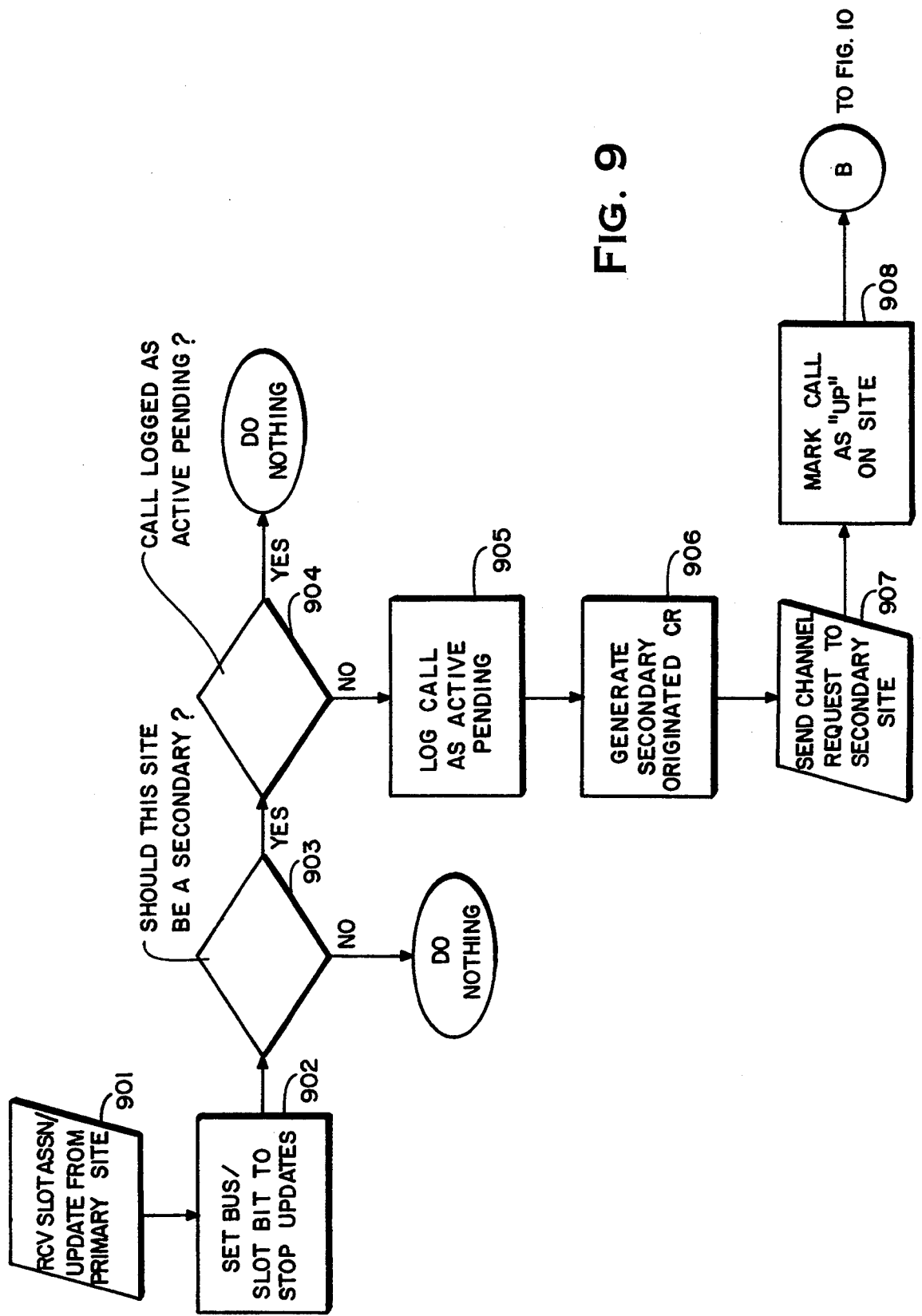
FIG. 9 is a flow chart showing a secondary site capturing a channel request from a primary site.
Figure 10:
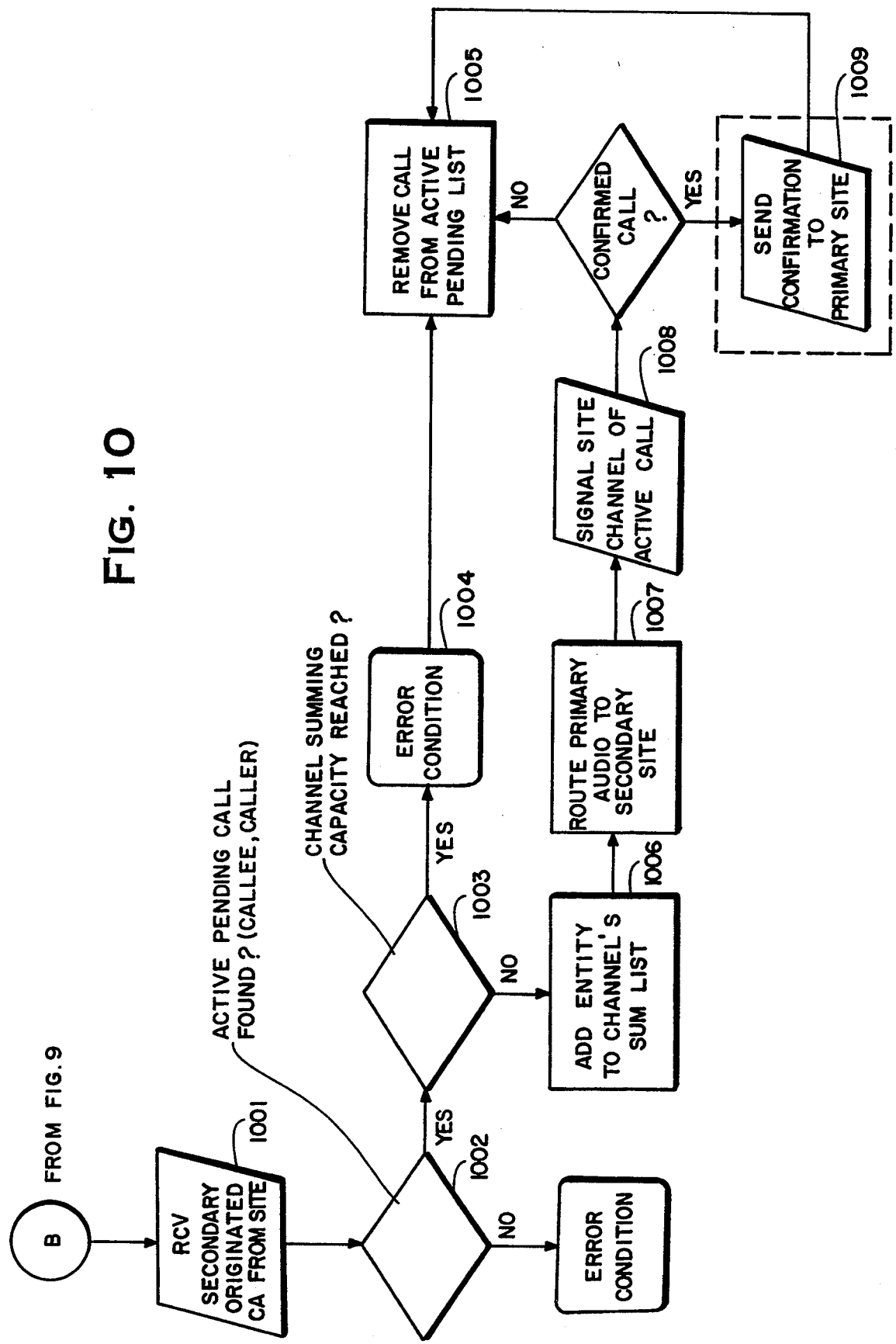
FIG. 10 is a flow chart showing the additional steps followed in capturing a channel request with confirmation.

As is shown in FIGS. 8 to 10, the secondary MIMs 801 receive to a slot assignment 405 and a slot update from a primary MIM in step #901. In step #902, each MIM checks its databases to determine whether the callee is listed as being in its area. If the callee is not in its area, then the node does nothing. If there is a callee in its area, the MIM is designated as a secondary site. The MIM sets the slot bit (or clears the bit if the slot assignment says the channel is dropped or unkeyed) on the bit map maintained in the RAM 302 to stop subsequent updates from being sent to the interface processor 303 on the card, step #902. In step #904, secondary site MIMs check whether the call is already logged in as being pending. If so, then the MIM does nothing in response to the update or slot assignment message. If the call is not logged in, then it is determined active pending in step #905. Active pending status means that the call is awaiting a channel assignment from the secondary site.

In step #906 and 907, the secondary MIM generates a secondary originated channel request (CR) and transmits it to its corresponding site controller. The MIM marks the call as being "up" on its site in step #908. When the site controller responds in step 1001 with a channel assignment (CA) by means of a secondary originated channel assignment from the site, the secondary MIM confirms in step #1002 that the channel assignment corresponds to an active pending call. If there is no active pending call, then an error condition is reported by the MIM.

Assuming the channel assignment matches a pending call, then the secondary MIM checks that its channel summing capacity has not been reached in step #1003. If the channel assignment would exceed capacity, then an error condition is reported and the corresponding call is removed from the active list in steps #1004 and #1005. If the capacity has not been reached, then, in step #1006, the channel assignment is added to the channel sum list maintained by the secondary MIM. The MIM then routes the audio slot from the primary MIM to the secondary site in step #1007. In addition, the MIM notifies its site controller that the call is now active (step #1008) and removes the call from the active pending list. If the call requires confirmation, then the secondary MIM sends a confirmation message via the message bus to the primary site in step #1009 before removing the call from the active pending list.

Figure 11:
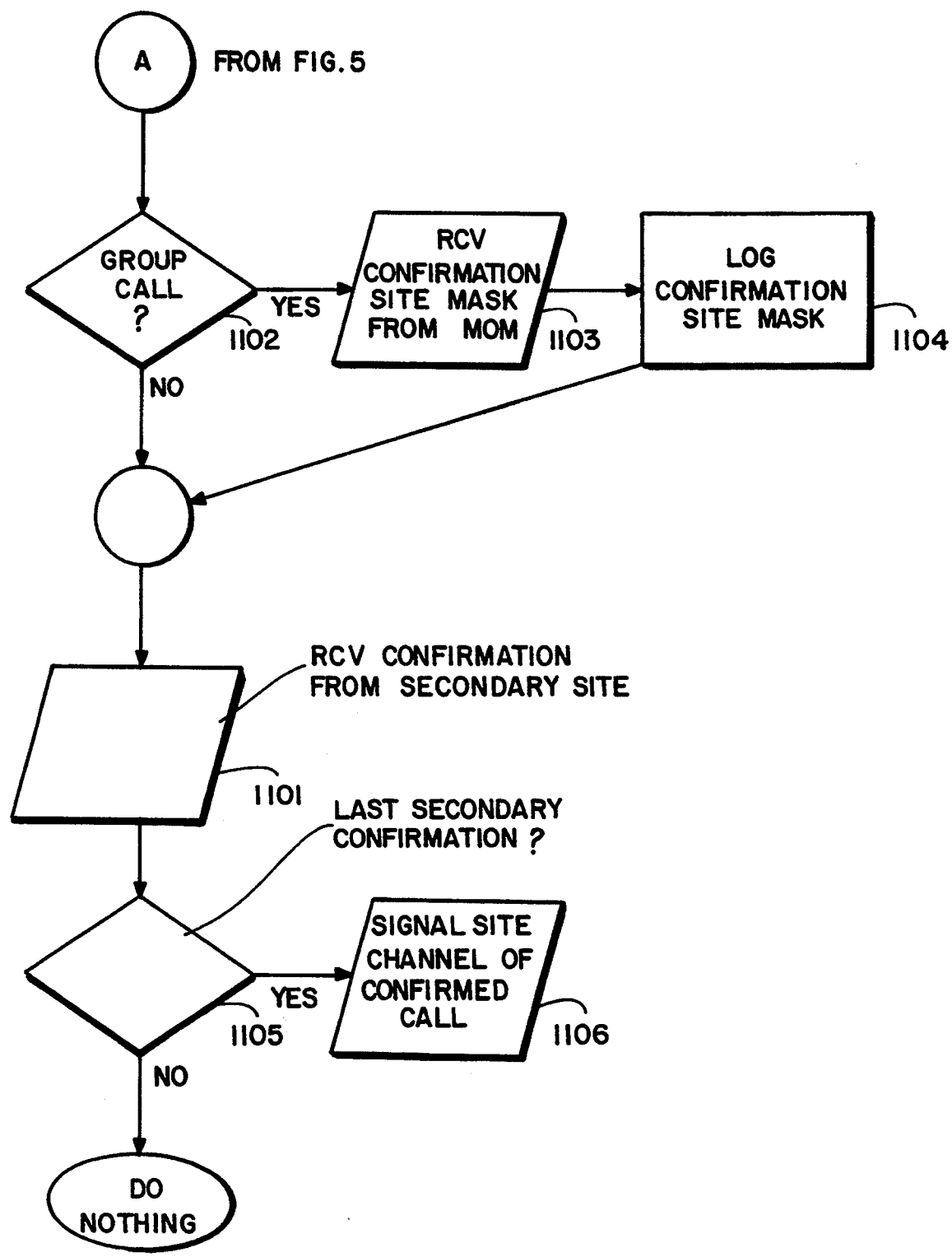
FIG. 11 is a flow chart that continues from FIG. 5 and shows processing steps for confirmation of calls.

As shown in FIG. 11, the primary MIM receives confirmation messages from the secondary MIMs for calls designated as confirmed calls in step #1101. Before receiving these confirmation messages, the primary MIM determines whether the call is to a group or to an individual unit in step #1102. Group calls require the primary site to receive a confirmation site mask from the MOM in step #1103. The primary site stores the site mask in memory in step #1104, and waits for confirmation messages from the secondary MIMs. Upon receiving each secondary MIM's confirmation message, the primary MIM checks whether the message is the last one to be received by using the site mask in step #1105. For calls to an individual unit, there will be only one confirmation message to be received. For group calls, the number of confirmation messages to be received is the number of secondary sites involved in the call. Upon receipt of the last confirmation message, the primary MIM transmits to the caller through the site controller that the call has been confirmed by all callees in step #1106.

Figure 12:
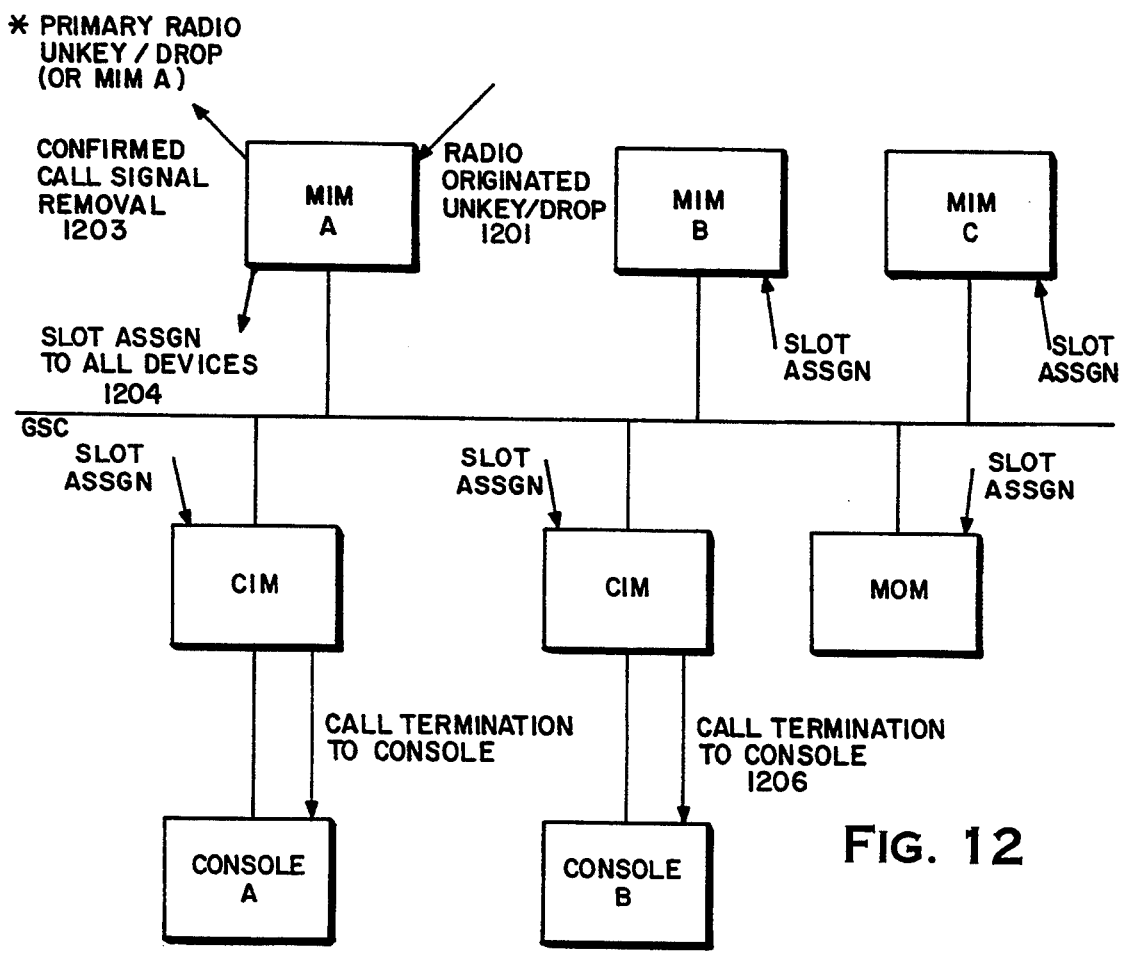
FIG. 12 is a message diagram of a primary radio unkeying/dropping a call.
Figure 13:
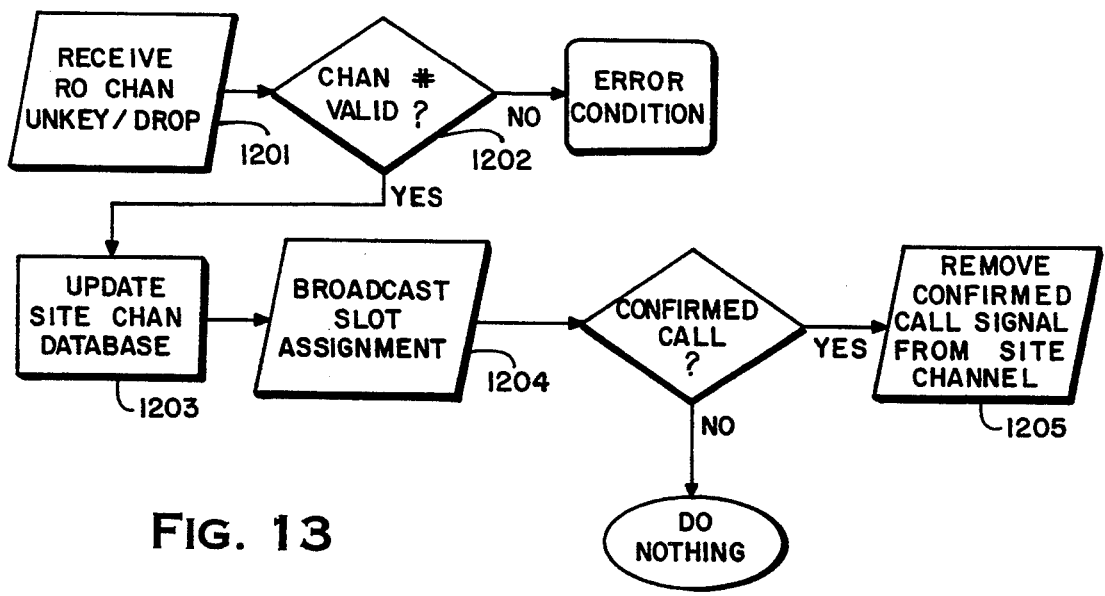
FIG. 13 is a flow chart of the primary radio unkeying/dropping a call.

As shown in FIGS. 12 and 13, the caller terminates a call by unkeying the PTT in his mobile radio. The site controller transmits an unkey or drop signal 1201 to the primary MIM. A drop signal terminates a call and causes the assigned audio slot to be idled. Unkeying for many calls, such as transmission trunked calls, also immediately generates a drop signal. For some calls, such as message trunking, there is a brief "hang time" between an unkey signal and a drop signal. The unkey signal by itself does not cause the site controller to deactivate a channel or a MIM to idle a slot. If there is a hang time between the unkey signal and drop signal, then during the hang time the audio communication line between the caller and callee(s) is maintained even though the caller is not transmitting. If the caller rekeys the call during this hang time, then he can immediately begin talking on the existing communication line. If the hang time expires before the call is rekeyed, then a drop signal is sent to terminate the channel assignments and slots.

In step #1202, the primary MIM confirms that the unkeyed channel is listed as being valid in its databases. Assuming that the channel is valid, the primary MIM updates its site channel database to verify the call termination. The primary MIM also sends an idle slot assignment message 1204 to the other nodes of the multisite switch informing them that the channel has been dropped. Additionally, if the call was confirmed, then the primary MIM removes the confirmed call signal from its site channel database in step #1205. Upon receipt of the idle slot assignment from the primary MIM, the CIMs notify their respective dispatcher consoles of the call termination in step #1206.

Figure 14:
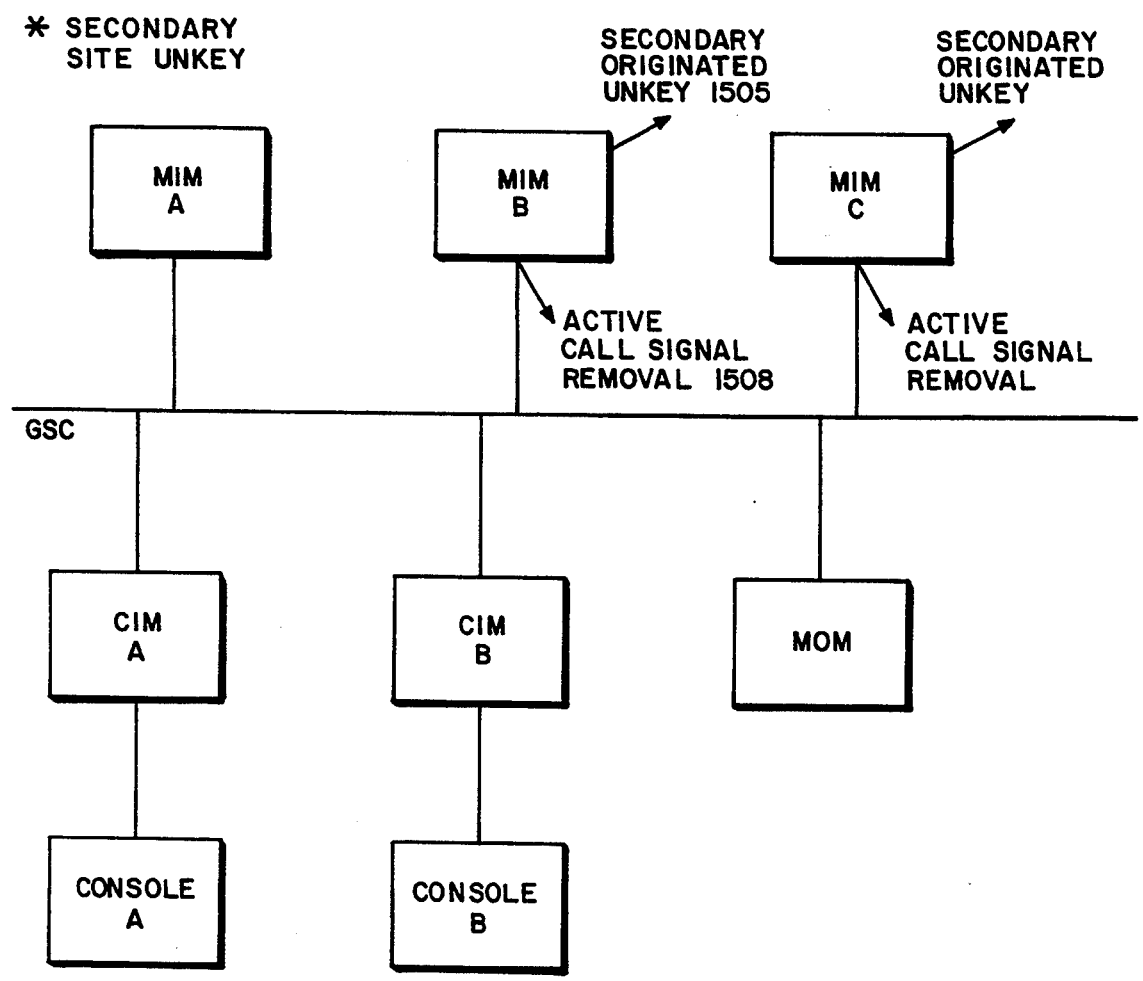
FIG. 14 is a message diagram showing a secondary site receiving an unkey and/or message drop signal.
Figure 15:
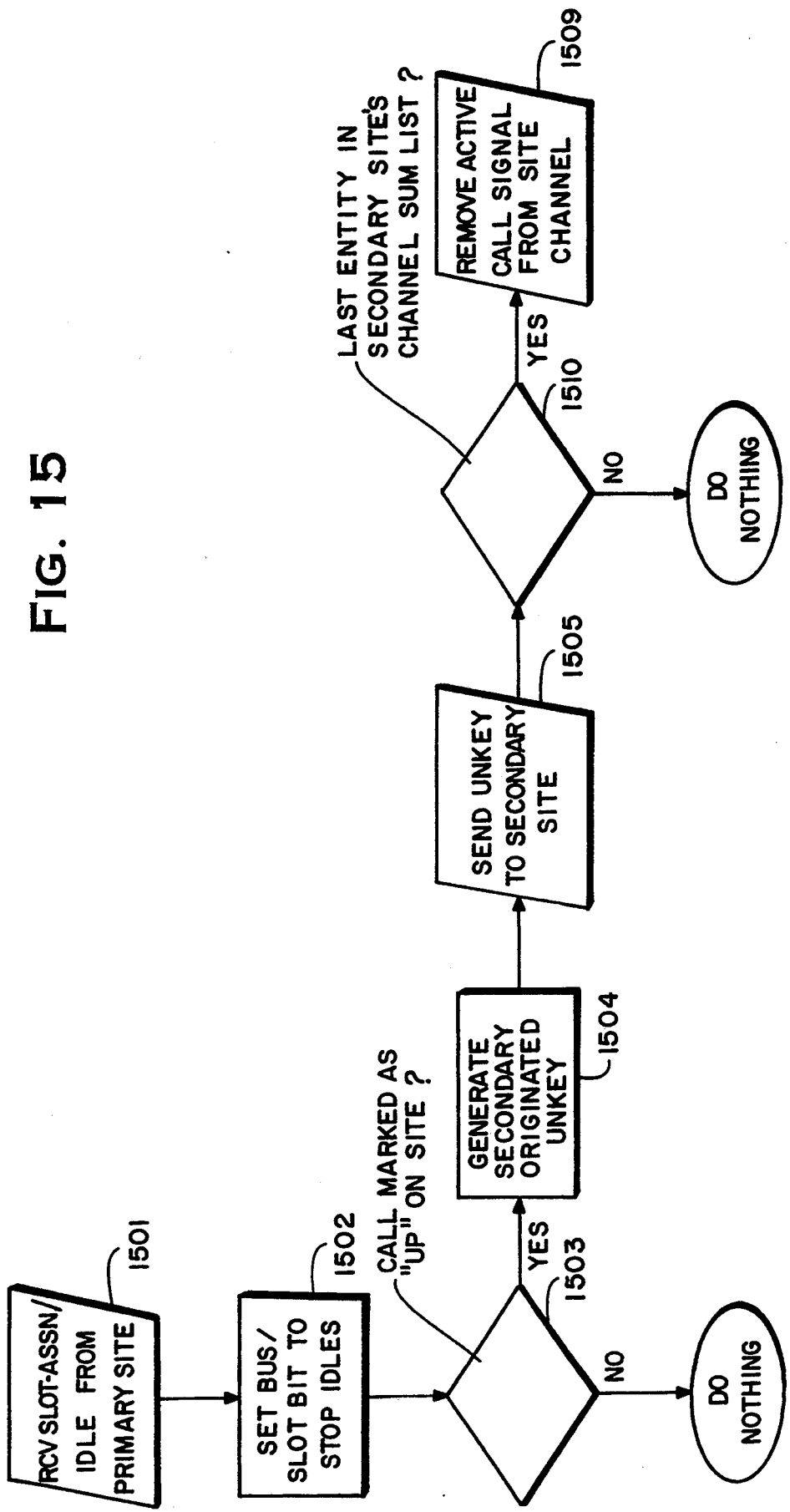
FIG. 15 is a flow chart showing a secondary site receiving an unkey/message drop signal.

As shown in FIGS. 14 and 15, when they receive a slot assignment message indicating an unkey or channel drop, the MIM checks the bit for that slot in the slot bit map in RAM 302 in step #1501. If the bit indicates the slot is up, then in step #1502 the bit is reset to indicate that the audio slot is idle. If the MIM had the call logged into its site, step #1503, such as when a callee was in the site, then this secondary MIM generates and transmits a secondary originated unkey signal to its site controller in steps #1504 and #1505. The secondary MIM checks whether the unit that unkeyed is the last unit participating in the call in step #1510. If it is the last unit, then the secondary MIM removes the call from its list of active site channels.

Figure 16:
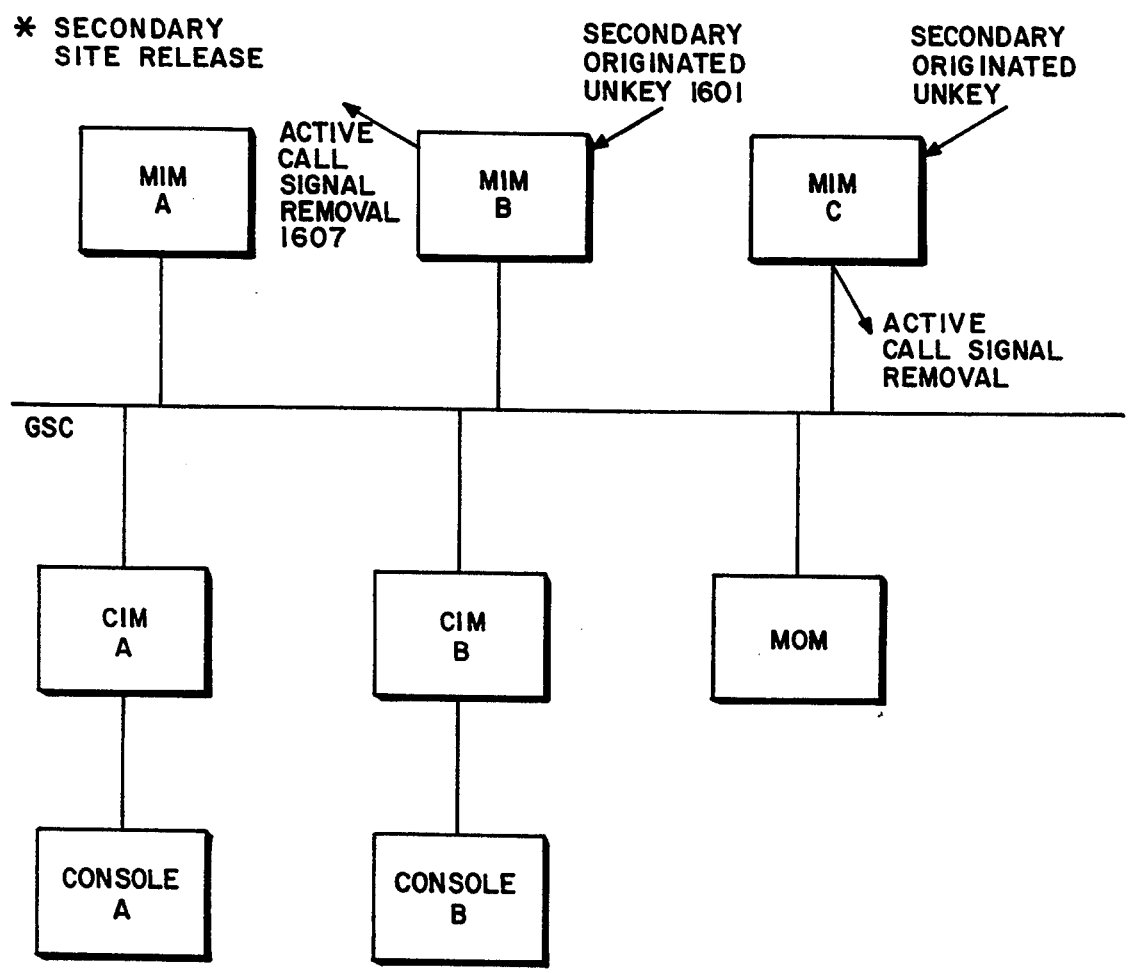
FIG. 16 is a message diagram showing a secondary site releasing a channel.

As shown in FIGS. 16 and 17, a callee can release itself from a call by sending a secondary originated unkey/drop signal 1601. Upon receiving an unkey/drop signal from its site controller, a secondary MIM checks if all of the units in its site participating in the call have been released from the call. In steps #1602 and #1603, the MIM checks whether the secondary unkey drop signal corresponds to each of the summed entities on the MIM's channel sum list and, if so, whether the callee is the last callee in the summed entity list. When the last callee is released, then the secondary MIM disengages its secondary site from the audio slot assigned by the primary MIM in step #1603. The secondary MIM also removes the callee from its channel sum list in step #1605. When the sum count equals zero in step #1606, there are no more callees assigned to the secondary MIM for that call. Accordingly, in step 1607, the secondary MIM signals the site controller to remove the call from the active list for that site.

As is shown in FIG. 18, a caller making a confirmed call can institute the call even if all of the callees do not respond with confirmation of the call. Confirmed calls are those that require confirmation from all of the callees before the call can be placed. However, the callee may desire to make the call even if not all of the callees respond to the call. Accordingly, the caller can override the normal operation of the confirmed call by rekeying his microphone. The rekeyed PTT signal will instruct the multisite switch to route the call through even though not all of the callees have confirmed that they are listening to the call.

In step #1801, the primary MIM receives the rekeyed PTT signaling that the confirmed call is to be overridden. In step #1802, the MIM returns a signal to its site controller acknowledging that the confirmed call is being established, albeit without all of the intended callees.

Figure 19:
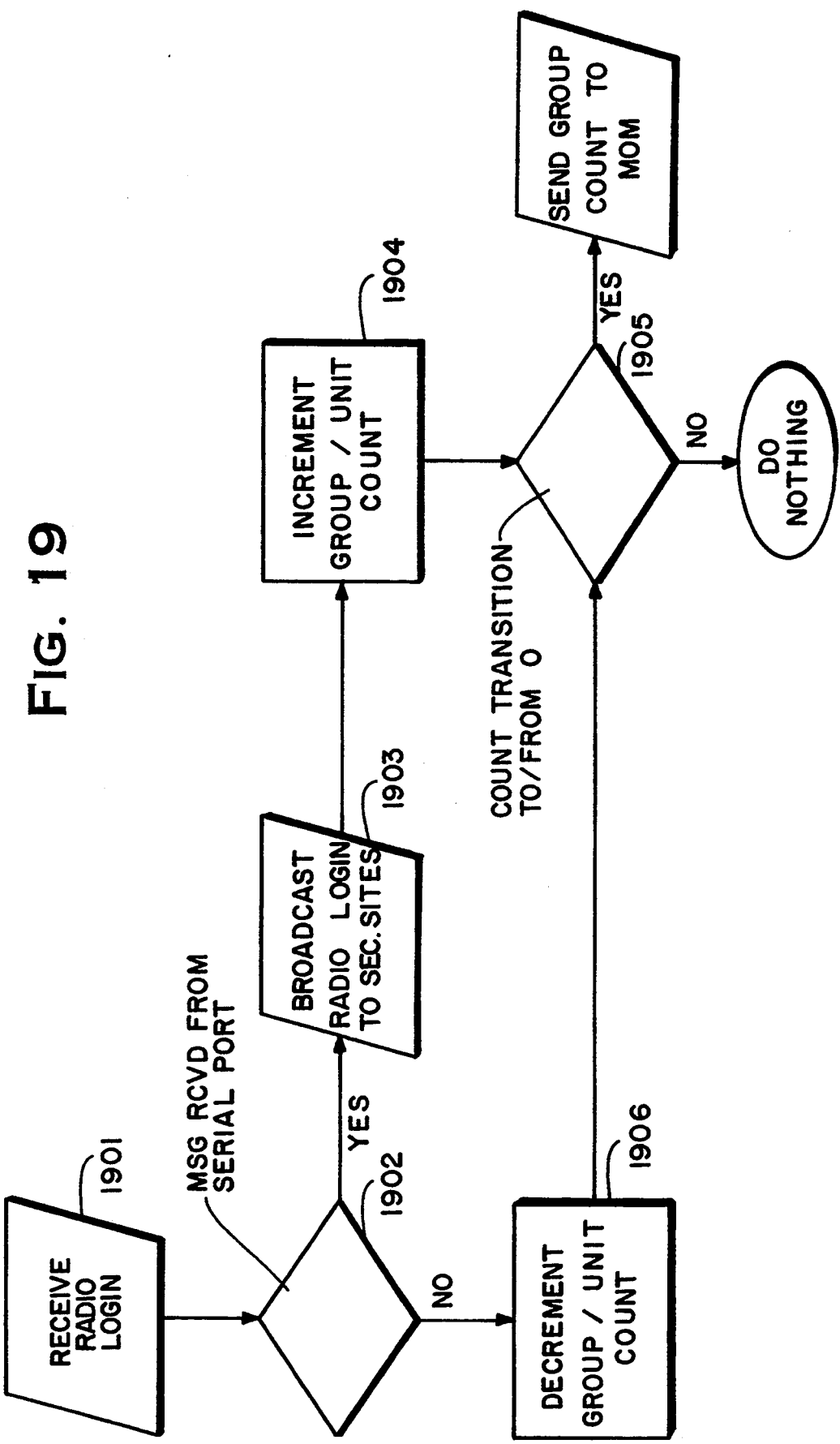
FIG. 19 is a flow chart showing radio login message processing by primary and secondary sites.

As shown in FIG. 19, the message sequence for the radio login is the same for primary and secondary MIMs. As previously discussed, a radio unit sends a login message to the site controller for the area when it enters a new area. This login message is conveyed to the MIM assigned to that new site in step #1901. In step #1902, the MIM checks whether the login message came through the serial port from the site controller or over the message bus from another MIM. Upon receiving a login message from the site, i.e., through the serial port of the communications controller in the switch controller card, the MIM sends the login through the message bus to all other MIMs in step #1903. In addition, the MIM updates its unit and group databases to identify the new unit. The MIM also increments its group count and unit databases in step #1904. If the group count transitions from zero in step #1905, then the MOM is notified that the MIM now has a unit assigned to the group.

The other MIMs that receive the login message from the message bus of the switch, check whether the unit was logged into its site area. The MIM that has the unit logged into its site deletes the unit from its unit databases. In step #1906, the MIM also decrements its group count for the group that the unit was assigned. If the unit was the last unit from the group to leave that site area, then the MIM notifies the MOM that the group count is zero for its site in step #1905.

The following section contains the formats and contents of the messages processed (transmitted and received) in the multisite switch in the preferred embodiment. The two external links to the multisite switch are to RF site controllers and to dispatcher consoles.

The downlink from a site controller is a 19.2 Kbs/s asynchronous serial link The link from a dispatcher console is normally a 19.2 Kbs/s serial link.

Console—CIM Message Interface

This section defines the message interface between the dispatcher console and the console interface module (CIM) in the multisite switch. These messages use a sliding window protocol and link recovery techniques discussed below.

System Access

Operator Login

This message identifies the console operator to the switch.

| | Console sends : LOGIN (63) | |
|---|---|---|
| # Bytes | Field | Function |
| (1) | message_id | LOGIN |
| (1) | operator_priority | priority of console operator |
| (2) | operator_id | id of console operator |
| (1) | privilege_level | privilege level of console operator (1=operator, 2=supervisor) |
| | Switch returns : CALL_STAT (101) | |
| # Bytes | Field | Function |
| (1) | message_id | CALL_STAT |
| (1) | msg_group | LOGIN |
| (1) | msg_sub_group | N/A |
| (1)** | call_variant | N/A |
| (2) | callee.id | operator id |
| (1) | callee.type | UNIT |
| (3) | caller | N/A |
| (1) | status | 0 - Success |
| (1) | host | console number |

Operator Logout

This message informs the switch that the operator is logging off of the console.

| | Console sends : LOGOFF (64) | |
|---|---|---|
| # Bytes | Field | Function |
| (1) | message_id | LOGOFF |
| | Switch returns : CALL_STAT (101) | |
| # Bytes | Field | Function |
| (1) | message_id | CALL_STAT |
| (1) | msg_group | LOGOFF |
| (1) | msg_sub_group | N/A |
| (1)** | call_variant | N/A |
| (3) | callee | N/A |
| (3) | caller | N/A |
| (1) | status | 0 - Success |
| (1) | host | N/A |

Module Functions

Module Programming

These messages allow the dispatcher to program a module to an entity (group, individual, conventional, phone line, etc.) selected from a list of system entities.

Add Module

| | Console sends : ADD-MODULE (58) | |
|---|---|---|
| # Bytes | Field | Function |
| (1) | message_id | ADD_MODULE |
| (2) | callee.id | id of entity programmed |
| (1) | callee.type | type of entity programmed |
| (1) | module_volume | current module volume |
| (1) | channel | audio channel number assigned to module |
| | Switch returns : CALL_STAT (101) | |
| # Bytes | Field | Function |
| (1) | message_id | CALL_STAT |
| (1) | msg_group | ADD_MODULE |
| (1) | msg_sub-group | module volume |
| (1)** | call_variant | Audio channel number (7 bits) assigned to module from above ICom Active bit from above |
| (3) | callee | from above |
| (3) | caller | N/A |
| (1) | status | 0 - Success 1 - Error |
| (1) | host | console number |

Delete Module

| | Console sends : DELETE_MODULE (59) | |
|---|---|---|
| # Bytes | Field | Function |
| (1) | message_id | DELETE_MODULE |
| (2) | callee.id | id of entity programmed |
| (1) | callee.type | type of entity programmed |
| | Switch returns : CALL_STAT (101) | |
| # Bytes | Field | Function |
| (1) | message_id | CALL_STAT |
| (1) | msg_group | DELETE_MODULE |
| (1) | msg_sub_group | N/A |
| (1)** | call_variant | N/A |
| (3) | callee | from above |
| (3) | caller | N/A |
| (1) | status | 0 - Success |
| (1) | host | console number |

Modify Module

| | Console sends : MODIFY_MODULE (62) | |
|---|---|---|
| # Bytes | Field | Function |
| (1) | message_id | MODIFY_MODULE |
| (2) | callee_delete.id | id of entity to delete |
| (1) | callee_delete.type | type of entity to delete |
| (2) | callee_add.id | id of entity to add |
| (1) | callee_add.type | type of entity to add |
| (1) | module_volume | current module volume |
| (1) | channel | audio channel number assigned to module |
| | Switch returns : CALL_STAT (101) | |
| # Bytes | Field | Function |
| (1) | message_id | CALL_STAT |
| (1) | msg_group | MODIFY_MODULE |
| (1) | msg_sub_group | module volume |
| (1)** | call_variant | audio channel number (7 bits) assigned to module from above ICom Active bit |
| (3) | callee | added callee |
| (3) | caller | deleted callee |
| (1) | status | 0 - Success 1 - Error |
| (1) | host | console number |

Module Volume and Mute

This message provides volume/mute control of audio levels on the channel assigned (select, unselect, etc.) to a programmed entity.

| | Console sends : MODULE_VOLUME (61) MUTE_MODULE (68) | |
|---|---|---|
| # Bytes | Field | Function |
| (1) | message_id | MODULE_VOLUME/MUTE_MODULE |
| (2) | callee.id | id of entity programmed |
| (1) | callee.type | type of entity programmed |
| (1) | module_volume | current module volume |

| Switch returns : CALL_STAT (101) | | |
|---|---|---|
| # Bytes | Field | Function |
| (1) | message_id | CALL_STAT |
| (1) | msg_group | MODULE_VOLUME/MUTE_MODULE |
| (1) | msg_sub_group | module volume |
| (1)** | call_variant | N/A |
| (3) | callee | from above |
| (3) | caller | N/A |
| (1) | status | 0 - Success |
| | | 1 - Error |
| (1) | host | console number |

Module Select/Unselect

This message causes audio for the programmed entity, e.g., mobile unit or dispatcher, to be routed to the channel specified. Currently, the message contains the select state of the entity, and the switch infers the channel number.

| Console sends : SELECT_MODULE (60) | | |
|---|---|---|
| # Bytes | Field | Function |
| (1) | message_id | SELECT_MODULE |
| (2) | callee.id | id of entity programmed |
| (1) | callee.type | type of entity programmed |
| (1) | channel | audio channel number assigned to module |
| Switch returns : CALL_STAT (101) | | |
| # Bytes | Field | Function |
| (1) | message_id | CALL_STAT |
| (1) | msg_group | SELECT_MODULE |
| (1) | msg_sub_group | N/A |
| (1)** | call_variant | audio channel number assigned to module from above |
| (3) | callee | from above |
| (3) | caller | N/A |
| (1) | status | 0 - Success |
| | | 1 - Error |
| (1) | host | console number |

Transmit Functions

Module Transmit

This message allows the console dispatcher to transmit to any entity that has been programmed into a module.

| Console sends : MESSAGE GROUP NUMBER (see Switch - Site Messages) | | |
|---|---|---|
| # Bytes | Field | Function |
| (1) | msg_group | message group number |
| (1) | msg_sub_group | message sub_group number |
| (1)** | call_variant | call qualifier flags |
| (2) | callee.id | id of entity programmed |
| (1) | callee.type | type of entity programmed |
| (2) | caller.id | id of console operator |
| (1) | caller.type | UNIT |
| (1) | operator_priority | console operator priority |
| (1) | node_id | CIM's node id in switch (filled in by CIM) |
| (4) | site_Mask | site participating in call (non Wide Area call only) |
| Switch returns : CALL_STAT (101) | | |
| # Bytes | Field | Function |
| (1) | message_id | CALL_STAT |
| (1) | msg_group | (A) from above |
| | | (B) PREEMPT DIRECTIVE |
| | | (C) from table in switch-site messages |
| (1) | msg_sub_group | (A/B) from above |
| | | (C) from table in switch site messages |
| (1)** | call_variant | call qualifier flags |
| (3) | callee | from above |
| (3) | caller | from above |
| (1) | status | (B/C) 0 - Success |
| | | (A) 1 - Error |
| (1) | host | (B/C) site number |
| | | (A) console number |

NOTE :
The switch returns the same message format for both console originated and mobile originated calls.

Module Unkey

This message terminates the operator's transmission to an entity.

| Console sends : CONSOLE_UNKEY (11) | | |
|---|---|---|
| # Bytes | Field | Function |
| (1) | msg_group | CONSOLE_UNKEY |
| (1) | msg_sub_group | UNKEY_ID (1) |
| (1)** | call_variant | call qualifier flags |
| (2) | callee.id | id of entity programmed |
| (1) | callee.type | type of entity programmed |
| (2) | caller.id | id of console operator |
| (1) | caller.type | UNIT |
| (4) | site-mask | site participating in call (non Wide Area call only) |
| Switch returns : CALL_STAT (101) | | |
| # Bytes | Field | Function |
| (1) | message_id | CALL_STAT |
| (1) | msg_group | from table in switch site messages |
| (1) | msg_sub_group | from table in switch site messages |
| (1)** | call_variant | call qualifier flags |
| (3) | callee | from above |
| (3) | caller | from above |
| (1) | status | 0 - Success |
| (1) | host | console number |

The switch returns the same message format for both console originated and mobile originated calls.

Patch/Simulselect Activation

These messages allow the console dispatcher to activate a simulselect or patch call. A simulselect allows the operator to transmit simultaneously to up to 16 entities, while a patch allows the operator to effectively combine up to 16 entities into a temporary group.

Console sends: PATCH_HEADER (103) or SIMUL_HEADER (104)

| # Bytes | Field | Function |
|---|---|---|
| (1) | message_id | PATCH_HEADER or |

| # Bytes | Field | Function |
|---|---|---|
| | | SIMUL_HEADER |
| (2) | said | System Assigned Id |
| (4) | callee_type_cnt[ ] | count for each callee type involved |
| (2) | caller.id | id of console operator |
| (1) | caller.type | UNIT |
| (1) | node_id | CIM's node id in switch (filled in by CIM) |
| (4) | site_mask | sites to be involved (filled in by MOM) |

Followed by: PATCH_COLLECTION (107) or SIMUL_COLLECTION (108)

| # Bytes | Field | Fnction |
|---|---|---|
| (1) | message_id | PATCH_COLLECTION or SIMUL_COLLECTION |
| (2) | said | System Assigned Id |
| (10) | id_list[5] | list of ids involved |
| (4) | site_mask | sites to be involved (filled in by MOM) | until all ids are sent.

Followed by: PATCH_ACTIVATE (111) or SIMUL_ACTIVATE (113)

| # Bytes | Field | Function |
|---|---|---|
| (1) | message_id | PATCH_ACTIVATE or SIMUL_ACTIVATE |
| (2) | said | System Assigned Id |
| (4) | site_mask | sites to be involved (filled in by MOM) |

Switch returns:

To all consoles on activation error: CALL_STAT (101)

| # Bytes | Field | Function |
|---|---|---|
| (1) | message_id | CALL_STAT |
| (1) | msg_group | PATCH_ACTIVATE or SIMUL_ACTIVATE |
| (1) | msg_sub_group | N/A |
| (1)** | call_variant | N/A |
| (2) | callee.id | SAID from above |
| (1) | callee.type | GROUP |
| (3) | caller | caller from above |
| (1) | status | 1 - Error |
| (1) | host | site number |

To all consoles on activation success:

| PATCH_ACTIVE (101) or SIMUL_ACTIVE (106) | | |
|---|---|---|
| # Bytes | Field | Function |
| (1) | message_id | PATCH_ACTIVE or SIMUL_ACTIVE |
| (2) | said | System Assigned Id |
| (4) | callee_type_cnt[ ] | count for each callee type involved |
| (2) | caller.id | id of console operator |
| (1) | caller.type | UNIT |
| (1) | node_id | initiating CIM's node id in switch |
| (4) | site_mask | sites involved (filled in by MOM) |

Followed by:

| PATCH_COLLECTED (109) or SIMUL_COLLECTED (110) | | |
|---|---|---|
| # Bytes | Field | Function |
| (1) | message_id | PATCH_COLLECTED or SIMUL_COLLECTED |
| (2) | said | System Assigned Id |
| (10) | id_list[5] | list of ids involved |
| (4) | site_mask | sites involved (filled in by MOM) | until all ids are sent.

Patch/Simulselect Removal

This message allows the console dispatcher to terminate an active patch or simulselect.

| Console sends: PATCH_DEACTIVATE (112) or SIMUL_DEACTIVATE (114) | | |
|---|---|---|
| # Bytes | Field | Function |
| (1) | message_id | PATCH_DEACTIVATE or SIMUL_DEACTIVATE |
| (2) | said | SAID of Active Patch or Simulselect |
| (4) | site_mask | sites involved (filled in by MOM) |

Switch returns: To all consoles on removal success:

| PATCH_INACTIVE (115) or SIMUL_INACTIVE (116) | | |
|---|---|---|
| # Bytes | Field | Function |
| (1) | message_id | PATCH_INACTIVE or SIMUL_INACTIVE |
| (2) | said | System Assigned Id |
| (4) | site_mask | sites involved (filled in by MOM) |

Miscellaneous Functions

Console Cross Mute

This message allows the console dispatcher to mute/unmute another console's transmit audio to prevent audio feedback.

| Console sends: CROSS_MUTE (67) | | |
|---|---|---|
| # Bytes | Field | Function |
| (1) | message_id | CROSS_MUTE |
| (1) | console_number | CIM number of console affected |
| (1) | state | 0 - uncross mute<br>1 - cross mute |

| Switch returns: CALL_STAT (101) | | |
|---|---|---|
| # Bytes | Field | Function |
| (1) | message_id | CALL_STAT |
| (1) | msg_group | CROSS_MUTE |
| (1) | msg_sub_group | N/A |
| (1)** | call_variant | state |
| (2) | callee.id | console number |
| (1) | callee.type | N/A |
| (3) | caller | N/A |
| (1) | status | 0 - Success<br>1 - Error |
| (1) | host | console number |

Console All Mute

This message allows the console dispatcher to mute/unmute all unselect audio.

| # Bytes | Field | Function |
|---|---|---|
| | Console sends : ALL_MUTE (57) | |
| (1) | message_id | ALL_MUTE |
| (1) | all_mute_volume | All Mute volume level |
| (1) | state | 0 - inactive All Mute |
| | | 1 - active All Mute |
| | Switch returns : CALL_STAT (101) | |
| # Bytes | Field | Function |
| (1) | message_id | CALL_STAT |
| (1) | msg_group | ALL_MUTE |
| (1) | msg_sub_group | N/A |
| (1)** | call_variant | state |
| (3) | callee | N/A |
| (3) | caller | N/A |
| (1) | status | 0 - Success |
| (1) | host | console number |

Console Intercom

This message allows the console dispatcher to communicate with another.

| # Bytes | Field | Function |
|---|---|---|
| | Console sends : ICOM_INITIATE (69) | |
| | | initiate ICom connection |
| | ICOM_ACTIVE (70) | |
| | | active ICom connection |
| | ICOM_BUSY (71) | |
| | | busy console |
| | ICOM_RELEASE (72) | |
| | | release ICom connection |
| | ICOM_HOLD (73) | |
| | | (un)hold ICom connection |
| | ICOM_TX (74) | |
| | | transmit to console |
| | ICOM_UNKEY (75) | |
| | | terminate transmission to console |
| # Bytes | Field | Function |
| (1) | message_id | from above |
| (2) | source_operator id | operator id of sending console |
| (2) | target_operator id | operator id of receiving console |
| (1) | state | 0 - unhold ICom |
| | | 1 - hold ICom |
| | | applicable to ICOM_HOLD only |
| (2) | bus_slot | bus slot for audio con applicable to ICOM_TX and ICOM_UNKEY only filled in by CIM |
| | Switch returns : CALL_STAT (101) | |
| # Bytes | Field | Function |
| (1) | message_id | CALL_STAT |
| (1) | msg_group | from above |
| (1) | msg_sub_group | N/A |
| (1)** | call_variant | state (ICOM_HOLD only) N/A otherwise |
| (2) | callee.id | target operator id |
| (1) | callee.type | UNIT |
| (2) | caller.id | source operator id |
| (1) | caller.type | UNIT |
| (1) | status | 0 - Success |
| | | 1 - Error |
| (1) | host | console number |

Console—CIM Link Protocol

The data link protocol between the console and CIM utilizes a sliding window technique. The implementation of the sliding window uses a 4-bit window value, which implies that the maximum number of outstanding data messages at any one time (receiver or transmitter) can be 16. The Tanenbaum's *Computer Networks*, pages 148-164, provides more information on the sliding window protocol.

The general message format is shown below.

| | |
|---|---|
| SB | Sync Byte (AA) |
| MTNB | Message type/Number of bytes |
| DMID | Data Message identifier |
| MSG : MSG | Message bytes |
| S/A | Sequence/ACK field (sending/receiving sequence) |
| CC | Checksum/CRC field |

Sync Byte

This field identifies the start of a data frame.

Message Type/Number of Bytes

This field is used to indicate the type of the message and the number of bytes in the message.

The message type field is located in the high order two bits of the byte. The values of this field are listed below.

| | | |
|---|---|---|
| DATA | Data ID | 01 |
| ACK | Acknowledgement | 02 |
| NAK | Negative ACK | 03 |

An ACK message is sent by the receiver when a message is correctly received (i.e, the checksum/CRC is correct). A NAK message is sent when the checksum/CRC is incorrect.

The number of bytes field comprise the remaining 6 bits of the byte. This field includes the DMID, MSG * n, S/A and CC fields described above.

Data Message Identifier

The data message id field is used to distinguish specific messages for processing by the receiver. The message types and subtypes used are listed in the CONSOLE—CIM MESSAGE INTERFACE section above.

Sequence/ACK Field

The sequence/ACK field is a single byte with the sequence and the ACK numbers occupying 4 bits each. The sequence number is the current packet number that is sent by the transmitter. The ACK field is the last correct packet received. This field functions as an acknowledgement for all packets up to and including the last correct packet referenced in the ACK field. Thus, for flow control the receiver may "freeze" the last correct packet number in the ACK field so that the transmitter is held off from sending any further messages until the receiver is ready.

The sequence/ACK field allows full duplex data transmission between the Console and the CIM. The starting values for the sequence and ACK fields are, SEQ=0, ACK=F (hex).

Checksum/CRC

This field is filled by the transmitter with a value such that the sum of all bytes in the message (adding with carry, excluding the sync byte and checksum), is equal to the checksum received. This field could also be filled with a CRC code if necessary.

An example of the console-CIM link protocol follows.

Assume the following:

The transmitter is sending a data message with sequence number=4,

The last received correct packet number=2, The message is a "poll" from the Console to the CIM

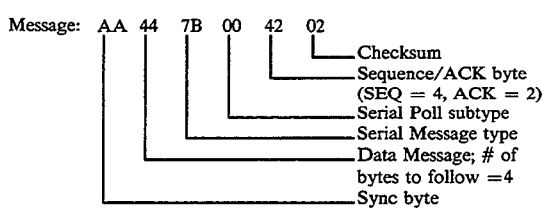

The CIM responds with and ACK:

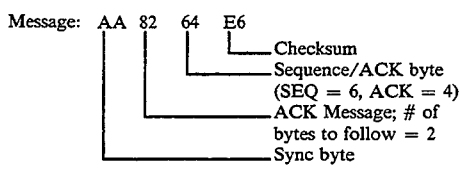

Console—CIM Link Error Recovery

These messages are used by the console/CIM to determine the integrity of the data link, and to reinitialize in the event of a failure.

Serial Poll

Link failure detection on the Console-CIM link is performed by periodic polling by both devices. The polls will be sent by the Console or the CIM as shown below.

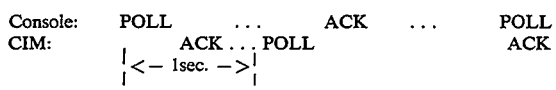

The serial poll message is listed below. If the link fails, then an ACK in response to the POLL message from the Console or the CIM will not be responded to. Five ACK timeout periods will be allowed. An ACK timeout period will nominally be set to 100 milliseconds in the preferred embodiment.

If after five such timeouts, the response to a poll is not received, the console and/or the CIM will begin sending a link reinitialize message (see SERIAL INIT MESSAGE).

| # Bytes | Console/CIM sends : SERIAL_MSG (123) Field | Function |
|---|---|---|
| (1) | message_id | SERIAL_MSG |
| (1) | message_sub_id | SERIAL_POLL |
| | CIM/Console returns : ACK Data Frame | |

Serial Init

If the console-CIM link is broken, a Serial Init Message is sent upon link restoration. This message causes the sliding window parameters in both devices to be set to starting values (SEQ=0, ACK=F and timeouts cleared). All outstanding messages in the CIM and the console will be cleared from their respective data buffers. Thus, a link reinitialize will result in the loss of any outstanding messages.

| # Bytes | Console/CIM sends : SERIAL_MSG (123) Field | Function |
|---|---|---|
| (1) | message_id | SERIAL_MSG |
| (1) | message_sub_id | SERIAL_INIT |
| | CIM/Console returns : ACK Data Frame | |

Switch Reset

In the event that the CIM goes through a reset during normal operation of the Console-CIM link, it will send a reset message to the dispatcher console. This message contains starting values for the SEQ and ACK numbers, and thus, may be out of the expected sequence at the console. However, the console will recognize the message and will in turn send a link reinitialization message to the CIM. This exchange will reset the protocol parameters in both the devices to the starting value.

| # Bytes | CIM sends: SERIAL_MSG (123) Field | Function |
|---|---|---|
| (1) | message_id | SERIAL_MSG |
| (1) | message_sub_id | SWITCH_RESET_MSG |
| | Console returns : ACK Data Frame | |

Switch—Site Messages

Upon receipt of a message from the RF site controller, the multisite switch's MIM connected to the site performs a translation of the message into system primitives. These primitives are used for call processing within the switch. Messages sent from the switch to the site controller are retranslated from primitives into a site recognizable format. The content of a system primitive follows.

| CHAN-PRIM (143) (contained in message when sent on GSC only) | | |
|---|---|---|
| # Bytes | Field | Function |
| (1) | msg_group | message group number |
| (1) | msg_sub_group | message sub group number |
| (2) | site_channel | site and channel in use Low byte = site number High byte = channel number |
| (3) | callee | entity receiving call |
| (1) | call_variant | call qualifier flags |
| (3) | caller | entity initiating call |

Outbound (to site controller) Messages

The following is a list of outbound switch-generated messages to the site. The msg_group and msg_sub_group fields correspond to the same fields used in the various messages defined above.

| Msg Group | Msg Sub Group | Name |
|---|---|---|
| | | Call Requests |
| 1 | 1 | Group Call |
| | 2 | Emergency Group Call |
| | 3 | VG Group Call |
| | 4 | Emergency VG Group Call |
| | 5 | Cancel Emergency |

| Msg Group | Msg Sub Group | Name |
|---|---|---|
| | | Special Calls |
| 4 | 1 | Clear Voice |
| | 2 | Interconnect |
| | 3 | Voice Guard |
| | 4 | Voice Guard & Interconnect |
| | | Individual Call Responses |
| 5 | 1 | Acknowledge ICall Receipt |
| | 2 | Answer ICall |
| | 3 | Terminate ICall |
| | | Individual Call II Requests |
| 6 | 1 | Clear Voice |
| | 2 | Voice Guard |
| | | Data Call Requests |
| 7 | 1 | Data Group Call |
| | 2 | Data Individual Call |
| | | System All-Call Requests |
| 8 | 1 | Clear Voice |
| | 2 | Voice Guard |
| | | Individual Call Requests |
| 9 | 1 | Clear Voice Forced Select |
| | 2 | Clear Voice Optional Select |
| | 3 | Voice Guard Forced Select |
| | 4 | Voice Guard Optional Select |
| | | Error Message Class |
| 10 | 1 | Group Setting Error |
| 11 | 1 | Console Unkey |
| Inbound (from site) Messages | | |
| | | Call Assignments |
| 21 | 1 | Clear Voice Group |
| | 2 | Emergency Clear Voice Group |
| | 3 | Voice Guard Group |
| | 4 | Emergency Voice Guard Group |
| | 5 | Individual Call II Clear Voice |
| | 6 | Individual Call II Voice Guard |
| | | Data Call Assignments |
| | 7 | Data Individual Call |
| | 8 | Data Group Call |
| | | Special Call Assignments |
| | 9 | Clear Voice Group |
| | 10 | Interconnect Group |
| | 11 | Voice Guard Group |
| | 12 | Interconnect Voice Guard Group |
| | 13 | Clear Voice Individual |
| | 14 | Interconnect Individual |
| | 15 | Voice Guard Individual |
| | 16 | Interconnect Voice Guard Individual |
| | | Individual Call Assignments |
| | 17 | Individual Call I Clear Voice |
| | 18 | Individual Call I Voice Guard |
| | | System All-Call Assignments |
| | 19 | Clear Voice Message Trunked |
| | 20 | Clear Voice Transmission Trunked |
| | 21 | Clear Voice Update Message Trunked |
| | 22 | Clear Voice Update Transmission Trunked |
| | 23 | Voice Guard Message Trunked |
| | 24 | Voice Guard Transmission Trunked |
| | 25 | Voice Guard Update Message Trunked |
| | 26 | Voice Guard Update Transmission Trunked |
| 22 | 1 | Channel Unkey |
| 23 | 1 | Channel Drop |
| | | System Message Class |
| 24 | 1 | System Assigned Id |
| | 2 | Convert To Callee |
| | 3 | Call Queued |
| | 4 | System Busy |
| | 5 | Call Denied |
| | | Status Request / Message Acknowledge |
| 25 | 1 | Status Response |
| | 2 | Inbound Message Acknowledge |
| | 3 | Status Request |

| Msg Group | Msg Sub Group | Name |
|---|---|---|
| | 4 | Radio Login |

Switch Internal Messages

The multisite switch internal messages are described in the following section. The messages are generated in response to console or site controller originated actions. These messages are sent from the source switch nodes to destination nodes via the GSC message bus. Thus, all messages described in this section are generated and processed within the multisite switch.

Slot Assignment/Update

A slot assignment message is broadcast to all nodes in the switch by an originator node upon assignment or release of an audio bus slot by that node. While the bus slot remains active, a slot update message is broadcast at an interval based upon current message bus loading. This serves to include latecomer nodes into a call that is already in progress.

| | node sends: | SLOT_ASSGN (102) for call activation |
| | | SLOT_UPDATE (124) for active call update |
| # Bytes | Field | Function |
|---|---|---|
| (1) | message_id | SLOT_ASSGN/SLOT_UPDATE |
| (2) | bus_slot | Audio Bus & Slot number Low byte = Bus number High byte = Slot number |
| (1) | host | entity that call is on (site #, console #, etc.) |
| (1) | msg_group | Message group number |
| (1) | msg_sub_group | Message sub group number |
| (1) | call_variant | call qualifier flags |
| (3) | callee | entity receiving the call |
| (3) | caller | entity initiating the call |

The message group and sub group numbers refer to those listed in SWITCH—SITE MESSAGES. The call qualifier flags in the call_variant field are used on a per call basis to tag any special features of the call. Thus, this field will vary with the type of call initiated. The bus and slot numbers will indicate which of the 32 busses and 32 slots are to be accessed for the active/terminated call's audio signal.

Slot Idle

Once a call on a bus slot has terminated, the originating node broadcasts to all nodes a slot idle message. Like the slot update, the broadcast interval is based upon current GSC loading. In the event that a receiving node missed the initial release message (slot assignment), the slot idle message enables the node to tear down the call.

| | node sends: | SLOT_IDLE (125) |
| # Bytes | Field | Function |
|---|---|---|
| (1) | message_id | SLOT_IDLE |
| (2) | bus_slot | Audio Bus & Slot number Low byte = Bus number High byte = Slot number |
| (1) | host | entity that call is on (site #, console #, etc.) |

-continued

| # Bytes | node sends: SLOT_IDLE (125) Field | Function |
|---|---|---|
| (1) | msg_group | Message group number |
| (1) | msg_sub_group | Message sub group number |
| (1) | call_variant | call qualifier flags |
| (3) | callee | entity receiving the call |
| (3) | caller | entity initiating the call |

Call Status

This message is used to return an error condition to a requesting CIM. The error conditions include: lack of priority to PTT; console preempt; patch or simulselect denial at the site, and system message from the site.

| # Bytes | node sends: CALL_STAT (101) Field | Function |
|---|---|---|
| (1) | message_id | CALL_STAT |
| (1) | msg_group | message group number |
| (1) | msg_sub_group | message sub group number |
| (1)** | call_variant | call qualifier flags |
| (3) | callee | entity receiving call |
| (3) | caller | entity initiating call |
| (1) | status | 0 - Successful<br>1 - Error |
| (1) | host | initiating host (console, site, etc.) |

Node Poll

To provide a pseudo real time update of the number of nodes in the switch and their assigned device type and number, the MOM sends a node poll message. This message is sent at a predetermined interval, and can address a range of nodes.

| # Bytes | MOM sends: NODE_POLL (131) Field | Function |
|---|---|---|
| (1) | message_id | NODE_POLL |
| (1) | low_addr | low address in GSC address range |
| (1) | high_addr | high address in GSC address range |

Node Active

Upon receipt of a node poll from the MOM, a node determines if its address lies within the range specified in the poll. If so, the node responds to the MOM with a node active message.

| # Bytes | node sends: NODE_ACTIVE (130) Field | Function |
|---|---|---|
| (1) | message_id | NODE_ACTIVE |
| (1) | node_id | responding node id |
| (1) | type | device type (MIM, CIM,etc.) |
| (1) | assignment | numeric assignment (site 1, console 2, etc.) |
| (1) | node_errors | boolean indicating node errors (TRUE = errors have occurred; FALSE = no errors) |

Status Request

To provide a pseudo real time update of status data for a specific node in the switch, the MOM sends the node a status request at approximately 1 second intervals. This process is activated when the MOM PC operator elects to monitor a node in his or her switch.

| # Bytes | MOM sends: STATUS_RQST (132) Field | Function |
|---|---|---|
| (1) | message_id | STATUS_RQST |

Status Response

Upon receipt of a status request message from the MOM, the node responds with a status response. This message contains information pertaining to various exception conditions that may have occurred.

| # Bytes | node sends: STATUS_RESP (133) Field | Function |
|---|---|---|
| (1) | message_id | STATUS_RESP |
| (1) | node_id | responding node id |
| (1) | type | device type |
| (2) | c152_serial_ovfl | communications controller serial port buffer overflow count |
| (2) | c152_gsc_ovfl | communications controller GSC message bus buffer overflow count |
| (2) | c152_to_c186_ovfl | communications controller to interface processor buffer overflow count |
| (2) | c186_serial_ovfl | interface processor serial port buffer overflow count |
| (2) | c186_gsc_ovfl | interface processor GSC message bus buffer overflow count |
| (2) | c186_to_c152_ovfl | interface processor to communications controller buffer overflow count |
| (2) | gsc_rx_error | GSC message bus receive error count |
| (2) | gsc_tx_error | GSC message bus transmit error count |

Clear Status Errors

The MOM PC operator has the option of clearing the status errors for any node in the switch. When this is done, the MOM sends a clear status errors message to this node, commanding it to clear its error counters.

| # Bytes | MOM sends: CLEAR_STATUS_ERRORS (144) Field | Function |
|---|---|---|
| (1) | message_id | CLEAR_STATUS_ERRORS |

CIM Select Request

The MOM is responsible for the database used to implement smart call in the switch. This database contains a list of entities selected at each console. To determine the select status of each console, the MOM sends a CIM select request to the CIM connected to the console.

MOM sends: CIM_SELECT_RQST (134)

| MOM sends: CIM_SELECT_RQST (134) | | |
|---|---|---|
| # Bytes | Field | Function |
| (1) | message_id | CIM_SELECT_RQST |

CIM Select Response

Upon receipt of a CIM select request message from the MOM, the node responds with a CIM select response for each entity selected at the CIM's console. The CIM also sends a CIM select response when the select status of a programmed entity is changed by the console operator.

| CIM sends: CIM_SELECT_RESP (135) | | |
|---|---|---|
| # Bytes | Field | Function |
| (1) | message_id | CIM_SELECT_RESP |
| (1) | console_number | console number responding |
| (3) | callee | programmed entity |
| (1) | bit_mask | bit identifying select status (see MODULE_SELECT bit in C_CIM.H) |

Smart Call

When a radio originated channel assignment is received by a MIM, it broadcasts a slot assignment to all nodes in the switch. Upon receipt of the slot assignment, the MOM determines if the callee is selected at any console connected to the switch. If so, the MOM sends a smart call message to all CIMs. This message affects the state of the "CALL" indicator at the console. If the entity is selected at any console, the indicator is constant. Otherwise, it flashes.

The MOM also sends a smart call message when the select count of a programmed entity transitions from 0 to 1, or vice versa. This could occur when the entity is selected/unselected at a console.

| MOM sends: SMART_CALL_ID (137) | | |
|---|---|---|
| # Bytes | Field | Function |
| (1) | message_id | SMART_CALL_ID |
| (3) | callee | programmed entity |
| (1) | call_variant | smart call state (see SMART_CALL bit in S_TYPE.H) |

Missed Channel Assignment/Drop

The MIM device type contains logic to detect missed channel assignment and drops on the site downlink. When this occurs, it sends a missed channel assignment/drop message to the MOM. The MOM records this information as part of the status data for the node.

| MIM sends: MISSED_CA (138) MISSED_CD (139) | | |
|---|---|---|
| # Bytes | Field | Function |
| (1) | message_id | MISSED_CA/MISSED_CD |
| (1) | node_id | node id of MIM |
| (1) | site | site number assigned |
| (1) | channel | channel number involved |

Device Slot Allocation

The MOM PC operator is responsible for the number of audio bus slots allocated to each node in the switch. This allocation is stored in EEPROM on the MOM Controller. When a node requiring bus slots resets (MIM or CIM), the MOM sends a device slot allocation message to it. This informs the node of the audio bus slots it has been allocated.

| MOM sends: DEVICE_SLOT_ALLOCATION (141) | | |
|---|---|---|
| # Bytes | Field | Function |
| (1) | message_id | DEVICE_SLOT_ALLOCATION |
| (2) | bus_slot | starting audio bus/slot Low byte = Bus number High byte = Slot number |
| (1) | slot_count | number of slots allocated |

The algorithm used to allocate bus slots executes in bus major form. For example, if the starting bus number =0, starting slot number=0, and the number of slots allocated=4, the bus/slot pairs allocated would be: 0,0 1,0 2,0 3,0. This method minimizes the impact on a node upon loss of an audio bus.

Patch/Simulselect Update Request

When a console operator logs into the connected CIM, the CIM sends a patch/simulselect update request to the MOM. This message prompts the MOM to respond with all active patch and simulselect information. This response is in the form of the messages described in patch/simulselect activation.

| CIM sends: PAT_SIM_UPDATE_REQ (142) | | |
|---|---|---|
| # Bytes | Field | Function |
| (1) | message_id | PAT_SIM_UPDATE_REQ |
| (1) | node_id | node id of CIM |

System Time

At one minute intervals, the MOM broadcasts the system time to all nodes in the switch via a system time message. This enables all nodes (and consoles) to synchronize their clocks to the PC connected to the MOM controller.

| MOM sends: SYSTEM_TIME (146) | | |
|---|---|---|
| # Bytes | Field | Function |
| (1) | message_id | SYSTEM_TIME |
| (2) | year | current year (1989-2099) |
| (1) | month | current month (1-12) |
| (1) | day | current day (1-31) |
| (1) | hour | current hour (0-23) |
| (1) | minute | current minute (0-59) |
| (1) | second | current second (0-59) |

Audio Channel Configuration

The MOM PC provides the operator with the ability to configure various audio parameters for each node in the switch. The MOM controller sends the node this information in the form of an audio channel configuration message. For a list of configuration options, see S_AUDIO.H

| MOM sends: AUDIO_CHAN_CONFIG_MSG (158) | | |
|---|---|---|
| # Bytes | Field | Function |
| (1) | message_id | AUDIO_CHAN_CONFIG_MSG |
| (1) | msg_sub_group | configuration option |
| (1) | channel | channel to configure |
| (1) | level | TX/RX gain |
| (1) | node_id | node id of receiving device |

Dynamic Node Addressing Messages

These messages are used to perform dynamic node addressing during switch or node power up. See Appendix B for a detailed description of dynamic node addressing.

| Address Request node sends: ADDR_RQST (119) | | |
|---|---|---|
| # Bytes | Field | Function |
| (1) | message_id | ADDR_RQST |
| (1) | node_id | potential node id |
| Address Denial node sends: ADDR_DENIAL (120) | | |
| # Bytes | Field | Function |
| (1) | message_id | ADDR_DENIAL |
| (1) | node_id | conflicting node id |
| Initialization Complete node sends: INIT_COMP (121) | | |
| # Bytes | Field | Function |
| (1) | message_id | INIT_COMP |

Node Priority Definition

This message is used to inform primary nodes of their secondary node address and secondary nodes of their primary address. The message is initiated from the MOM.

| MOM sends: NODE_PRIORITY (159) | | |
|---|---|---|
| # Bytes | Field | Function |
| (1) | message_id | NODE_PRIORITY |
| (1) | prim_node | primary node address |
| (1) | sec_node | secondary node address |

Console User Profile Data

The following sequence of messages is used to inform each console of their user profile shift data.

Console User Profile Identification

This message is used to inform the console of its 8 character ASCII name and 16 bit unit id. The message is initiated from the MOM.

| MOM sends: CONSOLE_USER_PROFILE_ID (160) | | |
|---|---|---|
| # Bytes | Field | Function |
| (1) | console | console number (1 - MAX_CONSOLES) |
| (8) | name | 8 character console name |
| (2) | unit_id | 16 bit unit id |

Console User Profile Shift Data

This message is used to inform the console of its shift specific data. Three shifts are supported. The message is initiated from the MOM.

| MOM sends: CONSOLE_USER_PROFILE_SHIFT (161) | | |
|---|---|---|
| # Bytes | Field | Function |
| (1) | message_id | CONSOLE_USER_PROFILE_SHIFT |
| (1) | console | console number (1 - MAX_CONSOLES) |
| (1) | shift | shift number (1 - 3) |
| (1) | priority | console priority |
| (1) | privilege | console privilege |
| (1) | def_unsel_vol | default unselect speaker volume |
| (1) | non_mon_emerg_vol | non-monitored emergency volume |
| (1) | mute_vol | mute volume |
| (1) | all_mute_delay | all mute delay |
| (1) | label_delay | label delay |
| (1) | screen_blank_timeout | screen blank timeout in minutes (CRT only) |
| (2) | bit_mask | bit mask (see S_SYS.H) |
| (8) | name | 8 character console name |
| (2) | unit_id | 16 bit unit id |

Console User Profile Return Status

This message is used to inform the MOM if the Console User Profile Data was received correctly. The message is initiated from the console.

| Console sends: CONSOLE_USER_PROFILE_STATUS (162) | | |
|---|---|---|
| # Bytes | Field | Function |
| (1) | message_id | CONSOLE_USER_PROFILE_STATUS |
| (1) | console | console number (1 - MAX_CONSOLES) |
| (1) | status | status (1 - success, 0 - failure) |

Nonvolitale RAM Cleared

This message is used to inform the MOM of any occurrance of nonvolatile memory being cleared in any of the switch nodes.

| node sends: NOVRAM_CLEARED (163) | | |
|---|---|---|
| # Bytes | Field | Function |
| (1) | message_id | NOVRAM_CLEARED |
| (1) | device_type | device type (CIM, MIM, MOM, etc.) |
| (1) | device_assgn | device assigned (CIM 1, MIM 2, etc.) |
| (1) | cause | cause for clearing |
| (2) | info | information field |

Switch Download Request/System Manager Data

This group of messages is used to distribute System Manager data throughout the system (CIMs, MIMs, MOM) for purposes of multisite operation and console programming operations.

Switch Download Request

This message is used to request System Manager data. The message is initiated from a MIM or CIM.

| #Bytes | Field | Function |
|---|---|---|
| | node sends: | SW_UNIT_ALL_REQ (147) |
| | | SW_UNIT_UPD_REQ (148) |
| | | SW_GROUP_ALL_REQ (149) |
| | | SW_GROUP_UPD_REQ (150) |
| | | SW_SITE_REQ (151) |
| (1) | message_id | specific request |
| (1) | device_type | device type (CIM, MIM) |
| | device_assgn | device assigned (CIM 1, MIM 2, etc.) |
| | node_id | node id of device |

System Manager Unit Record

This message is the unit (radio) data record as reported from the System Manager. The ALL id indicates a full database download from the System Manager, while the UPD indicates a download of only the modified records since the last download. The message is transmitted from the MOM to each CIM and MIM in the system.

| | MOM sends: SM_UNIT_ALL (224) | |
|---|---|---|
| | | SM_UNIT_UPD (226) |
| # Bytes | Field | Function |
| (1) | message_id | SM_UNIT_ALL/SM_UNIT_UPD |
| (2) | unit_id | unit id |
| (4) | forced_site_mask | sites on which unit must communicate |
| (1) | bit_mask | wide area/track/console bits |
| (1) | home_site | unit's home site number |
| (1 | — | MAX_SITES) |
| | home_group | unit's home group (1 - MAX_GROUPS) |
| (8) | unit_name | 8 character unit alias |

System Manager Group Record

This message is the group (agency/fleet/subfleet) data record as reported from the System Manager. The ALL id indicates a full database download from the System Manager, while the UPD indicates a download of only the modified records since the last download. The message is transmitted from the MOM to each CIM and MIM in the system.

| | MOM sends: SM_GROUP_ALL (225) | |
|---|---|---|
| | | SW_GROUP_UPD (227) |
| # Bytes | Field | Function |
| (1) | message_id | SM_GROUP_ALL/SM_GROUP_UPD |
| (2) | group_id | group id |
| (4) | forced_site_mask | sites on which group must communicate |
| (1) | bit_mask | wide area/track bits |
| (1) | group_type | group type (A/F/S) |
| (8) | group_name | 8 character group alias |

System Manager Site Record

This message is the site data record as reported from the System Manager. It identifies the alias given to each site configured in the system. The message is transmitted from the MOM to each CIM in the system.

| | MOM sends: SM_SITE_DB (93) | |
|---|---|---|
| # Bytes | Field | Function |
| (1) | message_id | SM_SITE_DB |
| (1) | site_id | site number |
| (8) | site_name | 8 character site alias |

Conventional Control Messages

The following data structure preceeds all conventional control messages throughout the switch. Each message has one of two message id's, shown below, followed by a message sub id defining the actual message itself. This message format allows nodes in the system receiving the message, but not needing the message, to filter through without having to switch on each individual message sub id.

| | Node sends: CONV_MSG_TYPE (155) | |
|---|---|---|
| | | CONV_MSG_RESP (156) |
| # Bytes | Field | Function |
| (1) | message_id | CONV_MSG_TYPE or CONV_MSG_RESP |
| (1) | msg_sub_id | message sub id |
| (1) | site | initiating / receiving site |
| (1) | node_id | initiating / receiving node id |

Conventional Base Station Control

This data structure is used to control the base station from the console dispatchers point of view. All messages are initiated from a console and are responded to from the Conventional Interface (CI) board.

| The conventional base station console sends msg_sub_id: | | |
|---|---|---|
| | REMOTE_ENABLE | (1) |
| | REMOTE_DISABLE | (2) |
| | REPEAT_ENABLE | (3) |
| | REPEAT_DISABLE | (4) |
| | CG_ENABLE | (5) |
| | CG_DISABLE | (6) |
| | CG_MON_LATCH | (7) |
| | CG_MON_PTT | (8) |
| | SCAN_ENABLE | (9) |
| | SCAN_DISABLE | (10) |
| | SIM_MON_ENABLE | (11) |
| | SIM_MON_DISABLE | (12) |
| | SET_RX_FREQ_1 | (13) |
| | SET_RX_FREQ_2 | (14) |
| | SET_RX_FREQ_3 | (15) |
| | SET_RX_FREQ_4 | (16) |
| | SET_TX_FREQ_1 | (17) |
| | SET_TX_FREQ_2 | (18) |

-continued

|  |  | SET_TX_FREQ_3 | (19) |
|---|---|---|---|
|  |  | SET_TX_FREQ_4 | (20) |
|  |  | ICOMM_TX | (22) |
| # Bytes | Field |  | Function |
| (1) | chn |  | channel (1-32) |
| (1) | status |  | status |

The CVIM responds with

| msg_sub_id: | REMOTE_ENABLE | (1) |
|---|---|---|
|  | REMOTE_DISABLE | (2) |
|  | REPEAT_ENABLE | (3) |
|  | REPEAT_DISABLE | (4) |
|  | CG_ENABLE | (5) |
|  | CG_DISABLE | (6) |
|  | CG_MON_LATCH | (7) |
|  | CG_MON_PTT | (8) |
|  | SCAN_ENABLE | (9) |
|  | SCAN_DISABLE | (10) |
|  | SIM_MON_ENABLE | (11) |
|  | SIM_MON_DISABLE | (12) |
|  | SET_RX_FREQ_1 | (13) |
|  | SET_RX_FREQ_2 | (14) |
|  | SET_RX_FREQ_3 | (15) |
|  | SET_RX_FREQ_4 | (16) |
|  | SET_TX_FREQ_1 | (17) |
|  | SET_TX_FREQ_2 | (18) |
|  | SET_TX_FREQ_3 | (19) |
|  | SET_TX_FREQ_4 | (20) |
|  | ICOMM_TX | (22) |

| # Bytes | Field | Function |
|---|---|---|
| (1) | chn | channel (1-32) |
| (1) | status | return status of command |

Conventional EE Pot Control

This message is used to adjust the transmit/receive gains on the Conventional (CI) board.

| MOM sends msg_sub_id: | INCREMENT_EE_POT | (33) |
|---|---|---|
|  | DECREMENT_EE_POT | (34) |
|  | SET_EE_POT | (35) |
|  | WRITE_EE_POT | (36) |

| # Bytes | Field | Function |
|---|---|---|
| (1) | chn | EE Pot channel to adjust |
| (1) | tx_rx | transmit / receive Pot |
| (1) | count | amount to adjust |

| MOM receives msg_sub_id: | INCREMENT_EE_POT | (33) |
|---|---|---|
|  | DECREMENT_EE_POT | (34) |
|  | SET_EE_POT | (35) |
|  | WRITE_EE_POT | (36) |

| # Bytes | Field | Function |
|---|---|---|
| (1) | chn | EE Pot channel adjusted |
| (1) | tx_rx | transmit / receive Pot |
| (1) | count | new EE Pot level |

Conventional CI EE Pot Levels

This message is initiated from the CI board and is used to report the EE Pot levels at startup.

| CI sends: CI_EE_POT_LEVEL (37) | | |
|---|---|---|
| # Bytes | Field | Function |
| (1) | chn | channel (1-32) |
| (1) | tx_rx | transmit / receive Pot |
| (4) | ee_levels | levels for 4 channels beginning with chn |

Conventional Controller Interface (CCI) Configuration/Status

This following messages are used to determine the status of the CCI card. The MOM PC sends the CCI its conventional site number and the CCI reports to the MOM when it's reset.

| MOM sends: CCI_CONFIG (38) | | |
|---|---|---|
| # Bytes | Field | Function |
| (1) | conv_site | conventional site # (1-2) |
| CCI sends: | | CCI_RESET (39) |
| (1) | conv_site | conventional site # reset CI Configuration |

This message is used to configure each individual CI channel.

| MOM sends: CI_CONFIG (40) | | |
|---|---|---|
| # Bytes | Field | Function |
| (1) | chn | channel to configure |
| (1) | config | configuration 2/4 wire tone/DC coupled/noncoupled E&M signaling |

Conventional Initialization Messages

The following data structure preceeds all conventional initialization messages throughout the switch. Each message has a message id of CONV_INIT_MSG. This message format allows nodes in the system receiving the message, but not needing the message, to filter through without having to switch on each individual message sub id.

| Node sends: CONV_INIT_MSG (157) | | |
|---|---|---|
| # Bytes | Field | Function |
| (1) | message_id | CONV_MSG_TYPE or CONV_MSG_RESP |
| (1) | command | program command |
| (1) | conv_site | receiving conventional site |
| (1) | node_id | initiating node id |
| (1) | chn | channel to program |

Conventional DC Program Control

This message is used to program a Conventional Interface (CI) card for a DC base station. The message is initiated by the MOM and transmitted to the CI card.

| MOM sends: CONV_INIT_MSG (157) | | |
|---|---|---|
| # Bytes | Field | Function |
| (7) | dc_level | DC levels: −11mA −6mA −2.5mA 0mA +2.5mA +6mA +11mA |

Conventional Tone Program Control

This message is used to program a CI card for a tone base station. The message is initiated by the MOM and transmitted to the CI card.

| MOM sends: CONV_INIT_MSG (157) | | |
|---|---|---|
| # Bytes | Field | Function |
| (11) | tone_frq | Tone frequencies: |
| | 1050 Hz | |
| | 1150 Hz | |
| | 1250 Hz | |
| | 1350 Hz | |
| | 1450 Hz | |
| | 1550 Hz | |
| | 1650 Hz | |
| | 1750 Hz | |
| | 1850 Hz | |
| | 1950 Hz | |
| | 2050 Hz | |

Interprocessor Messages

GSC Traffic Update Message

The communications controller sends the interface processor a GSC Traffic Update message at 30 ms intervals. A low pass filter is applied to this data to produce an average load figure for the traffic on the message bus. This figure is then compared to a threshold constant. If the average traffic volume is above the threshold, then the node does not execute its slot updating message generation tasks. If the traffic volume is below the threshold, the node's update process is invoked.

| GSC_TRAFFIC_UPDATE (127) | | |
|---|---|---|
| # Bytes | Field | Function |
| (1) | message_id | GSC_TRAFFIC_UPDATE |
| (1) | msg_count | count of GSC messages |
| (2) | byte_count | count of GSC bytes |

Buffer Overflow Message

The communications controller sends the interface processor a buffer overflow message at 0.8 second intervals. The interface processor records this overflow data in RAM, and provides it to the MOM upon receipt of a status request.

| BUFFER_OVERFLOW (128) | | |
|---|---|---|
| # Bytes | Field | Function |
| (1) | message_id | C152_BUFFER_OVERFLOW |
| (2) | serial_ovfl | C152 serial port buffer overflow count |
| (2) | gsc_ovfl | C152 GSC buffer overflow count |
| (2) | to_186_ovfl | C152 to C186 buffer overflow count |

GSC Error Count Message

The communications controller sends the interface processor a GSC message bus error count message at 0.8 second intervals. The interface processor records this message bus error data in RAM, and provides it to the MOM upon receipt of a status request.

| GSC_ERROR_COUNT (129) | | |
|---|---|---|
| # Bytes | Field | Function |
| (1) | message_id | GSC_ERROR_COUNT |
| (2) | gsc_rx_error | GSC receive error count |
| (2) | gsc_tx_error | GSC transmit error count |

Serial/Interprocessor Message

This message allows the communications controller to originate its own messages and receive serial messages. The communications controller generates a message and places it in the dual-port RAM buffer packet for serial transmit or the packet for interprocessor messages. Upon receipt of a SERIAL_INTER_PROC message, the interface processor simply routes the message back to the serial transmit or interprocessor buffer in the dual port RAM for the communications controller. This procedure enables the communications controller to handle low-level protocol within the normal message routing.

| SERIAL_INTER_PROC (126) | | |
|---|---|---|
| # Bytes | Field | Function |
| (1) | message_id | SERIAL_INTER_PROC |
| (n) | variable length message | |

GSC/Interprocessor Message

As with the serial/interprocessor message, the GSC/interprocessor message provides the communications controller with a method of routing messages to and from its GSC transmit and interprocessor buffers via the interface processor.

| GSC_INTER_PROC (118) | | |
|---|---|---|
| # Bytes | Field | Function |
| (1) | message_id | GSC_INTER_PROC |
| (n) | variable length message | |

Interprocessor Message Transactions

The following message types are used by the communications controller and the interface processor to communicate with each other. Interprocessor messages are labeled to indicate the source of the message.

The message type byte is communicated to the receiving processor or controller by writing to reserved locations in the dual-port RAM as is described above. Using the memory map for the interface processor, the location 02FFE is written to by the communications controller for a transfer to the processor. Similarly, the interface processor writes to location 02FFC in the dual-port RAM for transfers in to the communications controller. The format of the message type byte is shown below.

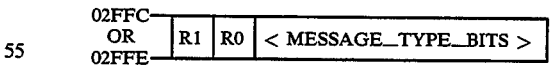

The two flags R1, R0 are not currently used and are reserved for an as of yet undefined function. The six remaining bits are used for the message type byte. Table B contains a list of system message types.

TABLE B

| Type Byte | Function |
|---|---|
| 00 | Serial I/O (data to/from a site, console, etc.). |
| 01 | Global Serial Channel I/O. Enables nodes to communicate with one another. |
| 02 | Interprocessor I/O. Enables |

TABLE B-continued

| Type Byte | Function |
|---|---|
| | the two processors on a Controller Card to communicate with one another. |

While the invention has been described in connection with what is presently considered to be the most practical and preferred embodiment, it is to be understood that the invention is not to be limited to the disclosed embodiment. On the contrary, the invention is intended to cover various modifications and equivalent arrangements included within the spirit and scope of the appended claims.

What is claimed is:

1. A local area network for a radio frequency multicasting system including a multisite switch comprising:
   a first microprocessor controlled node coupled through a first data link and to a first trunked audio link to a first transmitter;
   a second microprocessor controlled node coupled through a second data link and to a second trunked audio link to a second transmitter, where said second transmitter is in a separate site than is said first transmitter;
   an audio bus including a plurality of slots conveying audio communications between said transmitters, said audio bus being operatively connected to the first and second microprocessor controlled nodes, said nodes controlling slot assignments for said communications.

2. A local area network as in claim 1 further comprising a third microprocessor controlled node coupled to a dispatcher console through a third data link and a third trunked audio link.

3. A local area network as in claim 2 wherein said microprocessor controlled nodes are structurally substantially identical.

4. A local area network as in claim 3 wherein said microprocessor controlled nodes are structurally interchangeable.

5. A local area network as in claim 1 wherein said first and second nodes have a dynamic addressing means for assigning unique addresses to said nodes by each node selecting its own unique address.

6. A local area network for a radio frequency multicasting system including a multisite switch comprising:
   a first microprocessor controlled node coupled through a first data link and to a first trunked audio link to a first transmitter;
   a second microprocessor controlled node coupled through a second data link and to a second trunked audio link to a second transmitter, where said second transmitter is in a separate site than is said first transmitter;
   an audio bus operatively connected to the first and second microprocessor controlled nodes, said bus including a plurality of slots conveying audio communications between said transmitters, said nodes controlling slot assignments for said communications; and
   a message bus operatively coupled to said first and second nodes, said nodes repeatedly sending status messages on the message bus slot,
   whereby said nodes maintain a bus/slot bit map representative of the status of each audio slot and a redundant message discard means for discarding slot status messages redundant to a previously received slot status message.

7. A local area network for a radio frequency multicasting system providing communications between mobile user units and groups of user units, said system including a multisite switch comprising:
   a first microprocessor controlled node coupled through a first data link and to a first trunked audio link to a first transmitter;
   a second microprocessor controlled node coupled through a second data link and to a second trunked audio link to a second transmitter, where said second transmitter is in a separate site than is said first transmitter;
   an audio bus operatively connected to the first and second microprocessor controlled nodes, said bus including a plurality of slots conveying audio communications between said transmitters, said nodes controlling slot assignments for said communications and the microprocessor controlled nodes include databases for unit and group counts,
   said unit and group counts are indicative of mobile user units and user units assigned to a particular group in a broadcast area for a transmitter coupled to a respective node.

8. In a radio frequency multicasting system of the type having a central switch controlled by a local area network of nodes each having one or more microprocessor supported audio cards connected to a slotted audio bus within the switch, a controller card coupled to said audio cards and to a message bus within said switch, and plurality of radio frequency site controllers each coupled to an individual switch node, a method of establishing audio communications between said site controllers and through said switch comprising the steps of:
   receiving a channel assignment at a first node of the switch from a first site controller;
   generating an audio slot assignment message in said first node and placing the slot assignment message on the message bus;
   upon receipt of the slot assignment message from the bus, a second node sending a channel request to a second site controller operatively coupled to said second node;
   sending a second channel assignment to the second node from the second site controller and
   sending audio signals from the first site controller to the second site controller over the assigned audio slot on the switch.

9. A local area network for a radio frequency multicasting system including a multisite switch comprising:
   a first microprocessor controlled node coupled through a first data link and to a first trunked audio link to a first transmitter;
   a second microprocessor controlled node coupled through a second data link and to a second trunked audio link to a second transmitter, where said second transmitter is in a separate site than is said first transmitter;
   an audio bus operatively coupled to the first and second microprocessor controlled nodes, said bus including a plurality of slots conveying audio communications between said transmitters, said nodes controlling slot assignments for said communications and said nodes store databases of user groups, wherein each of said user groups identifying individual units in said system assigned to each group.

10. A local area network for a radio frequency multicasting system including a multisite switch comprising:

a first microprocessor controlled node coupled through a first data link and to a first trunked audio link to a first transmitter;

a second microprocessor controlled node coupled through a second data link and to a second trunked audio link to a second transmitter, where said second transmitter is in a separate site than is said first transmitter;

an audio bus operatively coupled to the first and second microprocessor controlled nodes, said bus including a plurality of slots conveying audio communications between said transmitters, said nodes controlling slot assignments for said communications and said nodes store databases identifying mobile units within the area covered by the transmitter coupled to the respective node.

11. A local area network for a radio frequency multicasting system including a multisite switch comprising:

a first processor controlled node coupled through a first data link and to a first trunked audio link to a first transmitter;

a second processor controlled node coupled through a second data link and to a second trunked audio link to a second transmitter, where said second transmitter is in a separate site than is said first transmitter;

an audio bus operatively coupled to the first and second processor controlled nodes, said bus including a plurality of slots conveying audio communications between said transmitters, said nodes controlling slot assignments for said communications.

* * * * *